(12) United States Patent
Ogawa et al.

(10) Patent No.: US 12,179,369 B2
(45) Date of Patent: Dec. 31, 2024

(54) HANDLING SYSTEM AND CONTROL METHOD

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Akihito Ogawa, Fujisawa Kanagawa (JP); Hideaki Kojima, Machida Tokyo (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 147 days.

(21) Appl. No.: 17/185,072

(22) Filed: Feb. 25, 2021

(65) Prior Publication Data

US 2021/0394364 A1    Dec. 23, 2021

(30) Foreign Application Priority Data

Jun. 19, 2020    (JP) .................................. 2020-106132

(51) Int. Cl.
*B25J 9/16*    (2006.01)
*B65G 1/137*    (2006.01)

(52) U.S. Cl.
CPC ........... *B25J 9/1684* (2013.01); *B25J 9/1664* (2013.01); *B25J 9/1687* (2013.01); *B65G 1/1376* (2013.01)

(58) Field of Classification Search
CPC ....... B65G 43/08; B65G 1/1376; Y02P 90/60; Y02P 90/02; G05B 2219/50393;
(Continued)

(56) References Cited

U.S. PATENT DOCUMENTS

2014/0180479 A1 * 6/2014 Argue ..................... B65B 5/105
  901/47
2016/0167227 A1   6/2016 Wellman et al.
(Continued)

FOREIGN PATENT DOCUMENTS

JP    2018-504333 A    2/2018
JP    6444499 B1    12/2018
JP    2020-151780 A    9/2020

*Primary Examiner* — Adam R Mott
*Assistant Examiner* — Elizabeth Rose Neleski
(74) *Attorney, Agent, or Firm* — Finnegan, Henderson, Farabow, Garrett & Dunner, LLP

(57) ABSTRACT

A handling system according to an embodiment handles/processes plural kinds of articles. The handling system includes first and second conveyance devices, and a control device. The first conveyance device transports a processing target article among the articles to a work area for a robot to handle/process the target article. The second conveyance device transports the target article to a work area for as operator to handle/process the target article. The control device determines by which of the robot or the operator the target article is processed according to process information generated based on an article handling/processing result by the robot in past. The control device transports the target article to the first conveyance device when the target article is determined to be processed by the robot and transports the target article to the second conveyance device when the target article is determined to be processed by the operator.

10 Claims, 23 Drawing Sheets

(58) Field of Classification Search
CPC ........... G05B 2219/45054; G05B 2219/39102; G05B 19/4182; G05B 19/41895; B25J 9/1687; B25J 9/1682; B25J 9/1684; B25J 9/1664; B25J 9/0093
See application file for complete search history.

(56) References Cited

U.S. PATENT DOCUMENTS

| | | |
|---|---|---|
| 2016/0167228 A1* | 6/2016 | Wellman ................ B25J 9/1602 901/3 |
| 2017/0021499 A1 | 1/2017 | Wellman et al. |
| 2017/0106532 A1 | 4/2017 | Wellman et al. |
| 2018/0141211 A1 | 5/2018 | Wellman et al. |
| 2019/0096055 A1* | 3/2019 | Namiki ................... B25J 19/023 |
| 2019/0368515 A1* | 12/2019 | Bachmaier ................ F15B 9/09 |
| 2020/0030978 A1 | 1/2020 | Diankov |
| 2020/0151407 A1* | 5/2020 | Wagner ................... B65G 47/12 |

\* cited by examiner

FIG.14

| ENTRY CATEGORY | ENTRY NAME | CONTENT OF ENTRY |
|---|---|---|
| REGISTRATION INFORMATION | ARTICLE ID | IDENTIFIER ALLOCATED FOR EACH KIND OF ARTICLE |
| | ITEM NUMBER | NUMBER ALLOCATED FOR EACH ITEM |
| | ITEM NAME | NAME REPRESENTING ITEM OF ARTICLE |
| | SKU NUMBER | NUMBER ALLOCATED FOR IDENTIFYING SKU |
| | SKU INFORMATION | INFORMATION INDICATING CONTENT OF SKU |
| | CATEGORY | INFORMATION INDICATING LARGE CATEGORY OF ARTICLE |
| | OUTER SHAPE INFORMATION | INFORMATION INDICATING OUTER SHAPE SIZE AND THE LIKE |
| | ARTICLE WEIGHT | INFORMATION INDICATING WEIGHT |
| | HANDLING INFORMATION | CAUTION INFORMATION CONCERNING HANDLING |
| | DESCRIPTION INFORMATION | BRIEF DESCRIPTION OF ARTICLE |
| PROCESS INFORMATION | HANDLING METHOD | OPERATOR, ROBOT, OR UNKNOWN |
| | ROBOT LIST | LIST SPECIFYING ROBOT CAPABLE OF PROCESSING |
| | TRACK RECORD INFORMATION | HISTORY OF PROCESSING, NUMBER OF PROCESSING SUCCESSES AND NUMBER OF PROCESSING FAILURES |

HANDLING SYSTEM AND CONTROL METHOD

CROSS-REFERENCE TO RELATED APPLICATIONS

This application is based upon and claims the benefit of priority from Japanese Patent Application No. 2020-106132, filed on Jun. 19, 2020; the entire contents of which are incorporated herein by reference.

FIELD

Embodiments described herein relate generally to a handling system and a control method.

BACKGROUND

Handling systems that handle plural kinds of articles are known. For example, a handling system including a conveyor to transport plural (different) kinds of articles and a plurality of robots with different end effectors is known. In such a handling system, a plurality of robots are arranged along the conveyor. Each robot handles an article that can be processed by the robot itself, among different kinds of articles transported by the conveyor, and performs a given process on the handled article.

However, in such a handling system, when there are a wide variety of articles to handle, it is difficult for a robot, to handle all of different kinds of articles. For example, locating a robot handling an article of special shape or material increases development costs for an end effector and robot hands and is inefficient. Thus, when there are a wide variety of articles to handle, the handling system operates in cooperation with human operators. Operators handle and process articles that are difficult for robots to handle.

However, in the job sites such as distribution warehouses in which general-purpose products and articles for daily use are handled, the changing rate of article types to be handled is high. It is therefore difficult for the handling system applied to such a job site to determine which of the articles cannot be handled by robots. In the handling system applied to such a job site, it has been difficult to allow robots and operators to efficiently cooperate with each other.

BRIEF DESCRIPTION OF THE DRAWINGS

FIG. 14 is a diagram illustrating an example of information managed by the management system;

DETAILED DESCRIPTION

According to an embodiment, a handling system, which handles and processes plural kinds of articles, includes a first conveyance device, a second conveyance device, and a control device. The first conveyance device is configured to transport a target article to be processed among the plural kinds of articles to a work area for a robot to handle and process the target article. The second conveyance device is configured to transport the target article to a work area for an operator to handle and process the target article. The control device is configured to determine by which of the robot or the operator the target article is to be processed, in accordance with process information generated based on a result of handling and processing of an article by the robot in the past. Furthermore, the control device is configured to transport the target article to the first conveyance device when the control device determines that the target article is to be processed by the robot, and transport the target article to the second conveyance device when the control device determines that the target article is to be processed by the operator.

Embodiments herein provide a handling system and a control method that allow robots and operators to efficiently cooperate with each other. Embodiments will be described below with reference to the drawings.

Handling System 10

Figure 1:
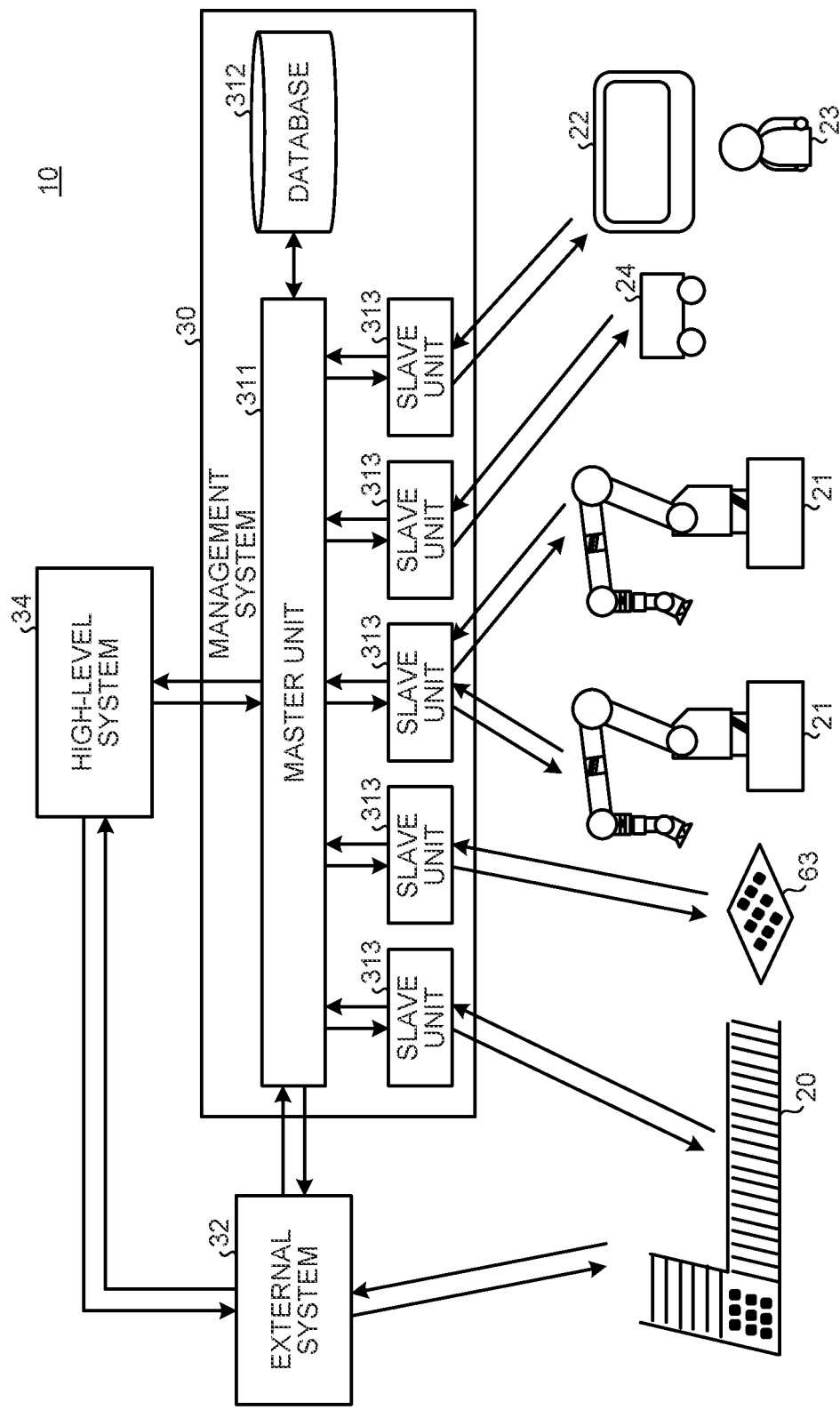
FIG. 1 is a diagram illustrating a handling system according to an embodiment.

FIG. 1 is a diagram illustrating a handling system 10 according to an embodiment. The handling system 10 transports a target article 14 to be processed among plural (different) kinds of articles 12 to a robot 21 or an operator 23 to allow the robot 21 or the operator 23 to handle the target article 14 and perform a given process.

The handling system 10 includes a conveyance system 20, one or more robots 21, one or more terminal devices 22, a management system 30, an external system 32, and a high-level system 34. The handling system 10 operates in cooperation with one or more operators 23.

The conveyance system 20 receives the target article 14 to be processed among different kinds of articles 12 from the external system 32 and transports the received target article 14 to a work space for the robot 21 or a work space for the operator 23. The conveyance system 20 may be material handling equipment including a plurality of conveyors. The conveyance system 20 may partially include a movable robot 24.

The conveyance system 20 includes a distribution device 63. The distribution device 63 is a mechanism that sends the target article 14 to one of the work space for the robot 21 or the work space for the operator 23 in accordance with control from the management system 30.

When the target article 14 is transported to the work space, each of one or more robots 21 handles and processes the transported target article 14. The handling system 10 includes, for example, different kinds of robots 21 and can handle and process different kinds of articles 12. For example, the robot 21 performs a process such as picking, packing, unloading, loading, unpacking, checking, and inspection, for the target article 14.

Each of one or more terminal devices 22 is held by an operator 23. Each of one or more operators 23 holds any one of the terminal devices 22. When the target article 14 is transported to the work space, the operator 23 handles and processes the transported target article 14. For example, the operator 23 performs a process, such as picking, packing, unloading, loading, unpacking, checking, and inspection, for the target article 14.

The management system 30 is an information processing device such as a computer. The management system 30 may be a cloud system on a network or a device including a plurality of computers operating in cooperation with each other. The management system 30 controls transportation of the target article 14 and a given process for the target article 14 by the conveyance system 20, the robot 21, the terminal devices 22, and the external system 32. The management system 30 exchanges information with the high-level system 34 and performs information processing in cooperation with the high-level system 34.

The high-level system 34 is an information processing device such as a computer. The high-level system 34 may be a cloud system on a network or a device including a plurality of computers operating in cooperation with each other. The high-level system 34 is, for example, a warehouse management system, an inventory management system, and a transportation management system and performs information processing for storing, managing, and transporting a plurality of articles 12 on an upper layer of the management system 30.

The external system 32 supplies the target article 14 to be processed among different kinds of articles 12 to the conveyance system 20. For example, the external system 32 is a warehouse in which different kinds of articles 12 are stored, and an inbound process and an outbound process are automatically performed.

The management system 30 includes, as functional blocks, a master unit 311, a database 312, and a plurality of slave units 313.

The master unit 311 is an interface mainly with an external device, a system, and the database 312. The master unit 311 controls transportation of the target article 14 by the conveyance system 20 and optimizes a transportation plan. Each of the slave units 313 is connected to a device, such as the robot 21 and the terminal device 22, included in the conveyance system 20. Each of the slave units 313 manages the connected device, gives an instruction to the connected device, or acquires a work status from the connected device. The slave unit 313 connected to the terminal device 22 displays an instruction given to the operator 23 on the terminal device 22, acquires information input by the operator 23 from the terminal device 22, or acquires a work status sensed by the terminal device 22 from the terminal device 22. When a device such as the robot 21 is added to the handling system 10 or a device is removed from the handling system 10, the management system 30 adds or deletes the corresponding slave unit 313. The management system 30 thus can reduce changes in the master unit 311 and the database 312.

Figure 2:
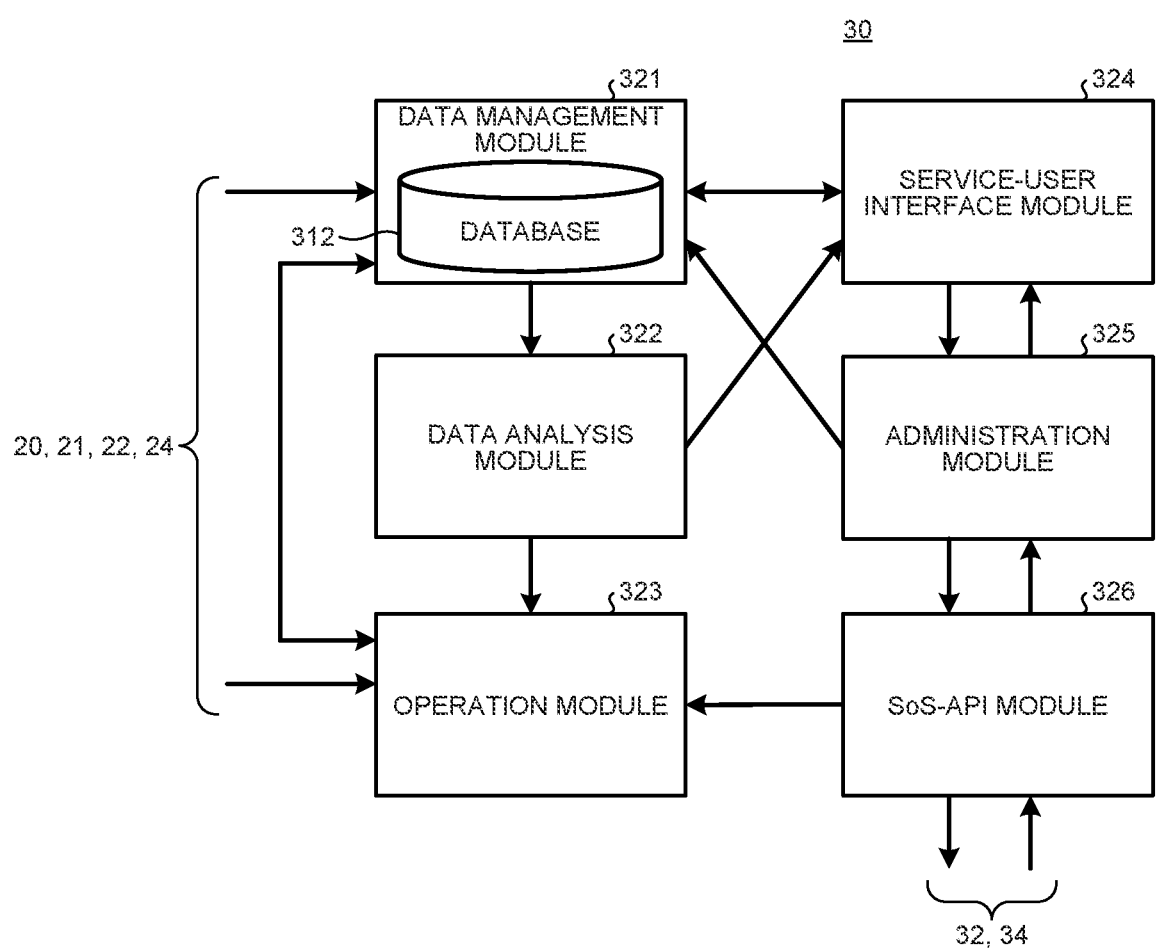
FIG. 2 is a diagram illustrating a functional configuration of a management system.

FIG. 2 is a diagram illustrating a functional configuration of the management system 30. The management system 30 includes, as a functional configuration, a data management module 321, a data analysis module 322, an operation module 323, a service-user interface module 324, an administration module 325, and an SoS-API module 326.

The data management module 321 manages the database 312. The database 312 stores information on articles 12 to be processed by the robots 21 and the conveyance system 20, robot data, end effector data, and operational data. The operational data includes information produced during operation, such as an operational status of the robot 21 and a process result for articles 12. The data management module 321 acquires data from the database 312 or updates data managed by the database 312.

The data analysis module 322 acquires necessary data from the data management module 321. Further, the data analysis module 322 performs an analysis process necessary for operation executed in the operation module 323, based on the acquired data.

The operation module 323 executes data update operation, robot motion command operation, and the like. In the data update operation, the operation module chooses data stored in the database 312 or generates new data from a plurality of pieces of data, based on the analysis result by the data analysis module 322. In the robot motion command operation, the operation module 323 controls the each robot 21, controls the conveyance system 20, or controls the distribution device 63, based on the analysis result by the data analysis module 322.

The operation module 323 transports the target article 14 to the robot 21, replaces the end effector of the robot 21 according to the kind of the target article 14, or gives a process content to the robot 21. In addition, the operation module 323 transports the target article 14 to the operator 23 or transmits a process content to the terminal device 22 held by the operator 23. The operation module 323 thus can allow the robot 21 and the operator 23 to cooperate with each other efficiently.

The service-user interface module 324 accepts data to be input and output by the data management module 321 through a service-user interface. The service-user interface module 324 provides an external device with maintenance information or job-site improvement information generated based on the analysis result by the data analysis module 322.

The service-user interface module 324 may visualize an execution state of operation in the handling system 10, based on information from the data management module 321 and the data analysis module 322, and provide the visualized execution state to an external device. The service-user interface module 324 may accept operation input from a remote site.

The administration module 325 executes functions such as computer aided engineering (CAE), product lifecycle management (PLM), and enterprise asset management (EAM), using data input/output by the service-user interface module 324 and data managed by the data management module 321.

The SoS-API module 326 (system of systems application programing interface) provides an interface for connecting to the external system 32 and the high-level system 34. For example, the SoS-API module 326 provides warehouse management system (WMS), manufacturing execution system (MES), transportation management system (TMS), and the like.

Figure 3:
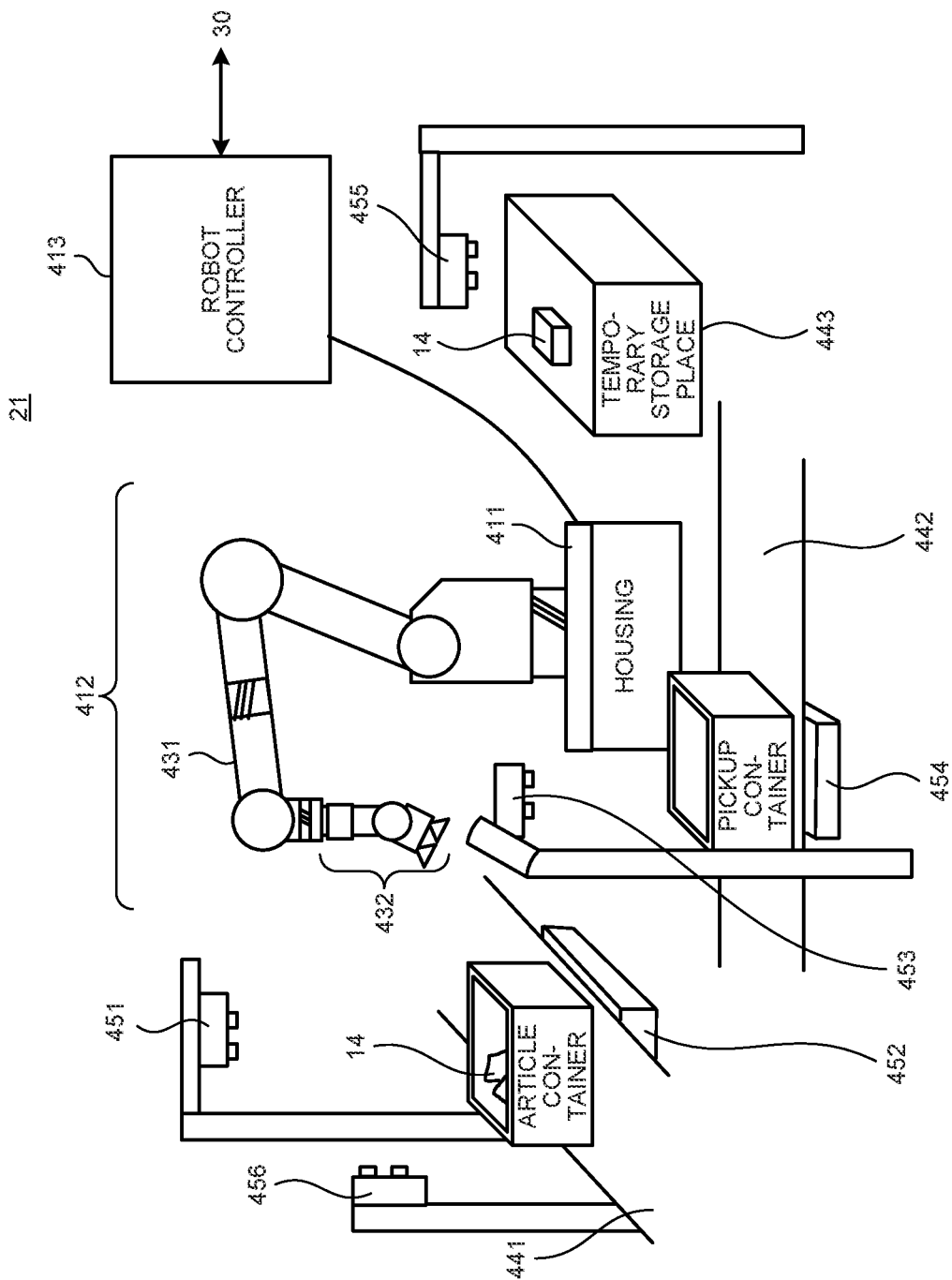
FIG. 3 is a diagram illustrating an example of a configuration of a robot.

FIG. 3 is a diagram illustrating an example of the configuration of the robot 21. The robot 21 illustrated in FIG. 3 transfers the target article 14 from an article container to a pickup container. That is, the robot 21 illustrated in FIG. 3 removes the target article 14 from an article container and puts the removed target article 14 into a pickup container. The robot 21 illustrated in FIG. 3 can also temporarily hold the target article 14 or pack the target article 14 in a box.

The robot 21 includes a housing 411, a manipulator 412, and a robot controller 413.

The housing 411 supports the manipulator 412. The housing 411 is connected to the robot controller 413. The housing 411 includes a power supply for actuating drivers, a tank storing compressed air, a compressor, a vacuum pump, an external interface such as a user interface, and a safety mechanism such as a light curtain and a collision sensor.

The manipulator 412 includes an arm 431 and an end effector 432. The arm 431 is an articulated robot driven by a plurality of servo motors. For example, the arm 431 illustrated in FIG. 3 is a six-axis vertical articulated robot. The arm 431 may be, for example, a combination of a multi-axis vertical articulated robot, a SCARA robot, and a linear robot. The end effector 432 is a mechanism that sucks, jams, pinches, or grasps the target article 14 with a multi-finger mechanism.

The robot controller 413 is connected to the housing 411 and controls the arm 431 and the end effector 432. The robot controller 413 is connected to the management system 30 and operates in response to an instruction from the management system 30.

The robot 21 may further include an article container pull-in section 441, a pickup container pull-in section 442, and a temporary storage place 443. The article container pull-in section 441 pulls an article container containing the target article 14 into the work space from the conveyance system 20. The article container pull-in section 441 returns the article container to the conveyance system 20 after the target article 14 is removed. The pickup container pull-in section 442 pulls a pickup container into the work space from the conveyance system 20. The pickup container pull-in section 442 returns the pickup container to the conveyance system 20 after the target article 14 is put in. The temporary storage place 443 is a place for temporarily placing the target article 14 removed by the robot 21 from the article container before the target article 14 is put into the pickup container.

The robot 21 may include a sensor group. Each sensor included in the sensor group is connected, for example, to the robot controller 413 through the housing 411. The robot controller 413 controls the arm 431, the end effector 432, the article container pull-in section 441, and the pickup container pull-in section 442, based on information detected by the sensor group. The robot controller 413 may transmit information detected by the sensor group to the management system 30.

In the example in FIG. 3, the sensor group includes an article container sensor 451, an article container weight scale 452, a pickup container sensor 453, a pickup container weight scale 454, a temporary storage place sensor 455, and a handling sensor 456.

The article container sensor 451 is provided above the article container pull-in section 441. The article container sensor 451 detects whether an article container is transported to the work space for the robot 21 or detecting an internal state of an article container. The article container weight scale 452 is provided below the article container pull-in section 441. The article container weight scale 452 detects the weight of an article container.

The pickup container sensor 453 is provided above the pickup container pull-in section 442. The pickup container sensor 453 detects whether a pickup container has been transported to the work space for the robot 21 or detects an internal state of a pickup container. The pickup container weight scale 454 is provided below the pickup container pull-in section 442. The pickup container weight scale 454 detects the weight of a pickup container.

The temporary storage place sensor 455 is provided above the temporary storage place 443. The temporary storage place sensor 455 detects whether the target article 14 is placed on the temporary storage place 443 or detects a state of the target article 14.

The handling sensor 456 is a sensor for detecting a state of the target article 14 in a state in which the end effector 432 is handling the target article 14. For example, the handling sensor 456 detects the posture of the target article 14.

The article container sensor 451, the pickup container sensor 453, the temporary storage place sensor 455, and the handling sensor 456 are sensors capable of acquiring image information or three-dimensional information, such as RGB image cameras, distance image cameras, laser range finders, and LiDAR (light detection and ranging).

Figure 4:
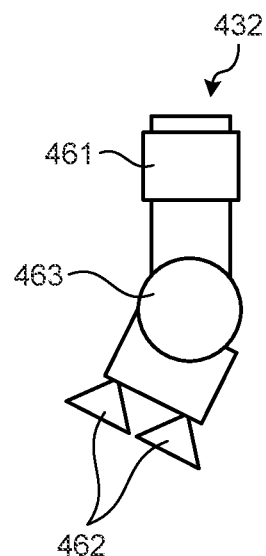
FIG. 4 is a diagram illustrating a first example of an end effector.

FIG. 4 is a diagram illustrating a first example of The end effector 432. The end effector 432 according to the first example is a suction-type end effector. The end effector 432 according to the first example includes a force sensor 461, a suction pad 462, and a flexion axis 463.

The force sensor 461 is provided at an end portion connected to the arm 431. The robot controller 413 controls the arm 431 and the end effector 432, based on a signal detected by the force sensor 461.

The suction pad 462 is provided at an end portion on the opposite side to the arm 431. The suction pad 462 sucks and holds an object. The robot 21 thus can handle the target article 14.

The flexion axis 463 is provided between the end portion connected to the arm 431 and the end portion on the opposite side to the arm 431. The robot controller 413 adjusts the posture of the suction pad 462 by controlling the angle of the flexion axis 463. The robot controller 413 thus can ensure that the suction pad 462 holds an object. The end effector 432 according to the first example thus can handle the target article 14.

Figure 5:
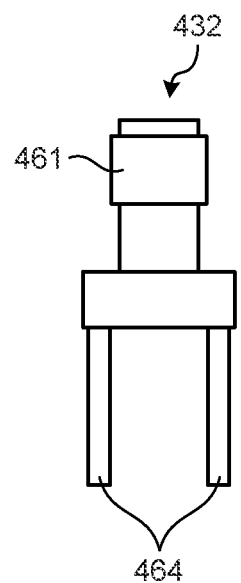
FIG. 5 is a diagram illustrating a second example of the end effector.

FIG. 5 is a diagram illustrating a second example of the end effector 432. The end effector 432 according to the second example is a pinch-type end effector. The end effector 432 according to the second example includes a force sensor 461 and a grasping mechanism 464. The grasping mechanism 464 is provided at an end portion on the opposite side to the arm 431. The grasping mechanism 464 grasps and holds an object. The end effector 432 according to the second example thus can handle the target article 14.

Figure 6:
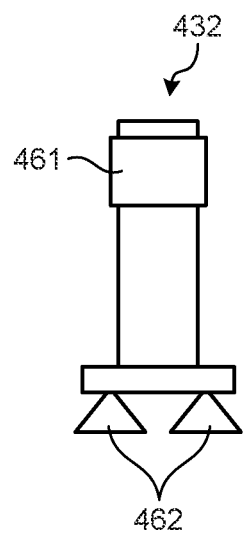
FIG. 6 as a diagram illustrating a third example of the end effector.

FIG. 6 is a diagram illustrating a third example of The end effector 432. The end effector 432 according to the third example is a suction-type end effector. The end effector 432 according to the third example includes a force sensor 461 and a suction pad 462. The end effector 432 according to the third example differs from the first example in that it does not include a flexion axis 463. This end effector 432 according to the third example can also handle the target article 14.

Figure 7:
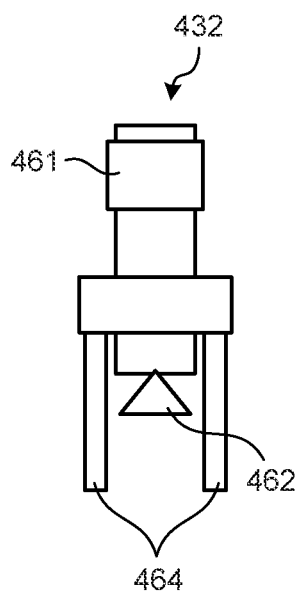
FIG. 7 is a diagram illustrating a fourth example of the end effector.

FIG. 7 is a diagram illustrating a fourth example of the end effector 432. The end effector 432 according to the fourth example is a hybrid-type end effector. The end effector 432 according to the fourth example includes a force sensor 461, a suction pad 462, and a grasping mechanism 464. The end effector 432 according to the fourth example can handle a wider variety of target articles 14, compared with the first to third examples.

The end effector 432 may be any other configuration. The end effector 432 according to the first example to the fourth example may have a different number of suction pads 462 or grasping mechanisms 464 of different sizes. The end effector 432 may have the suction pad 462 or the grasping mechanism 464 at various positions or in various postures. The end effector 432 may include other kinds of sensors such as a contact sensor.

Figure 8:
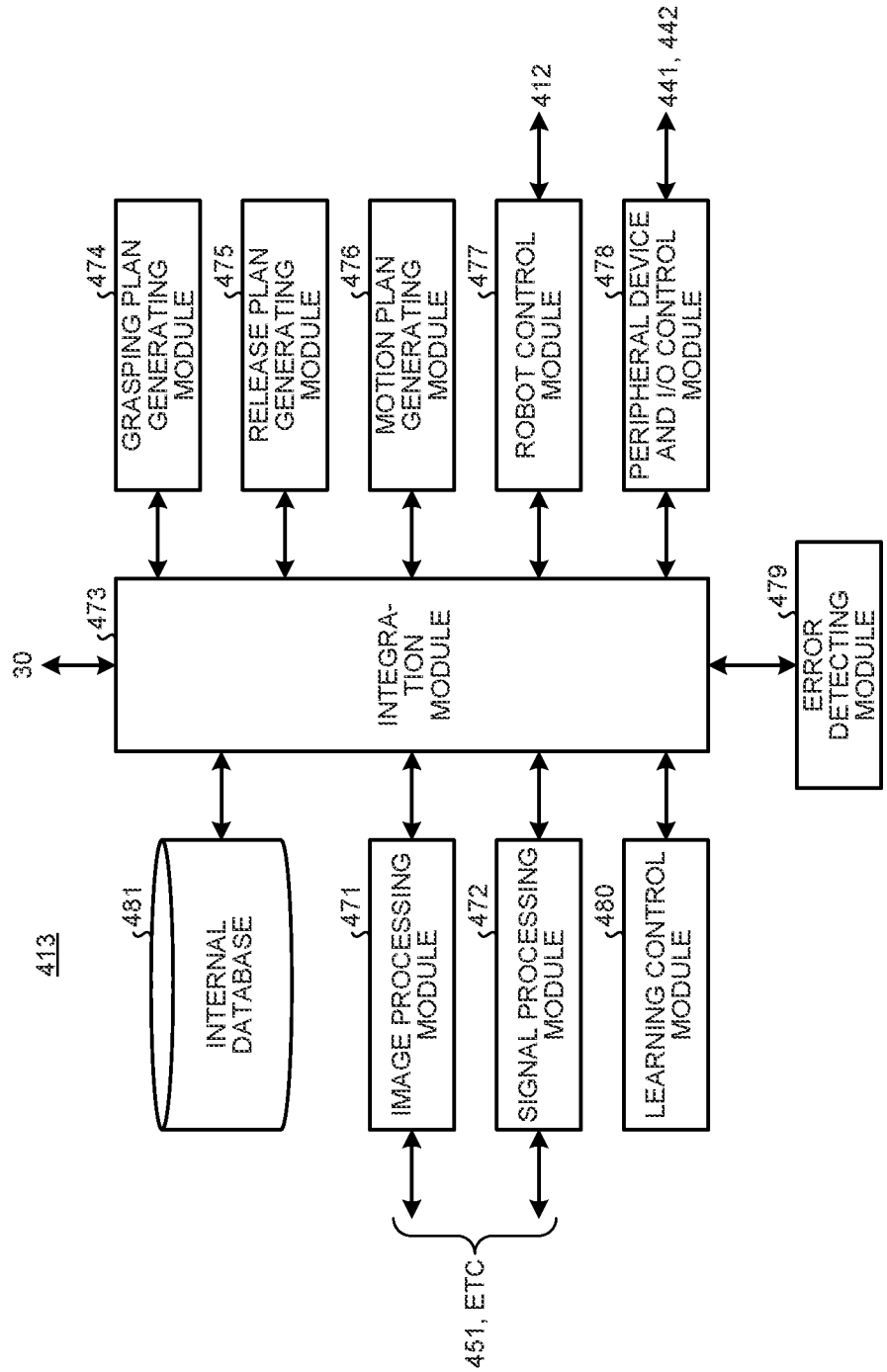
FIG. 8 as a diagram illustrating a functional configuration of a robot controller.

FIG. 8 is a diagram illustrating a functional configuration of the robot controller 413. The robot controller 413 includes a processor and a memory to execute a computer program. The robot controller 413 thus can implement the functions as illustrated in FIG. 8.

The robot controller 413 includes an image processing module 471, a signal processing module 472, an integration module 473, a grasping plan generating module 474, a release plan generating module 475, a motion plan generating module 476, a robot control module 477, a peripheral device and I/O control module 478, an error detecting module 479, a learning control module 480, and an internal database 481.

The image processing module 471 executes a process on information acquired from a sensor that acquires an image and generates information necessary for generation of a motion plan, motion control, error detection, and learning. The signal processing module 472 executes a process on information acquired from a sensor that acquires information other than images and generates information necessary for generation of a motion plan, motion control, error detection, and learning.

The integration module 473 generates a work plan for the robot 21, controls the robot 21, and manages the robot 21, based on information input from the management system 30, a state of the handling system 10, and information acquired from the sensor group.

The grasping plan generating module 474 calculates a grasping method for the target article 14 by the manipulator 412, the position and posture of the manipulator 412 at the time of grasping, and a movement plan at the time of grasping. The movement plan at the time of grasping represents a path of the position and posture of the manipulator 412 for grasping and moving the target article 14 without interfering with a surrounding object.

The release plan generating module 475 calculates an installation method indicating a motion method for the manipulator 412 for packing the grasped target article 14 or pressing the target article 14 against another object, a method of releasing the grasped target article 14, the position and posture of the manipulator 412 at the time of release, and a movement plan at the time of release. The movement plan at the time of release represents a path of the position and posture of the manipulator 412 for releasing and moving the target article 14 without interfering with a surrounding object.

The motion plan generating module 476 calculates robot motion information including a drive method, speed, and a motion path of the manipulator 412, for moving from the present position to a grasping position or a release position in accordance with the movement plan.

The robot control module 477 controls the robot 21 including the manipulator 412, in accordance with robot motion information generated by the motion plan generating module 476 and a motion switch instruction from the integration module 473.

The peripheral device and I/O control module 478 controls the on/off of the article container pull-in section 441, the pickup container pull-in section 442, an elevator for transportation, a peripheral device such as a safety door, and each sensor included in the sensor group, and the on/off of lighting.

The error detecting module 479 detects an error, based on a state of the robot 21, an implementation state of the work plan, a drive control state, grasping of the target article 14, and the observation result such as a transportation state, and the like. The error detecting module 479 acquires, for example, a value obtained by allowing a sensor value of the force sensor 461 or an endpoint coordinates value obtained by converting a sensor value of the force sensor 461 to pass through a lowpass filter, and determines an error if the acquired value exceeds a given value. Thus, when an error occurs, the robot controller 413 controls the robot 21 to suspend a process and controls the robot 21 to perform recovery operation.

The learning control module 480 executes robot model learning, grasping control parameter learning, grasping database learning, and error detection learning, and the like. The robot model learning is, for example, learning for suppressing vibration of the manipulator 412 and improving motion accuracy. The grasping control parameter learning is, for example, learning for improving the performance in grasping the target article 14. The error detection learning is, for example, learning for improving The performance in implementing a work plan. For example, the learning control module 480 sets a parameter of force control to an optimum value appropriate for the situation. The learning control module 480 thus can allow the robot 21 to perform a process efficiently with a smaller force.

The internal database 481 includes a robot database, an end effector database, an article database, a grasping database, and an environment database.

The robot database includes the structure of the robot 21, the size and weight of each part of the robot 21, moment of inertia, and the operation range, speed, and torque performance of each driver. The end effector database includes information about the function of the end effector and the grasping characteristics of the end effector.

The article database stores name, identification information, category, and image information of the whole surface, CAD model information, weight information, and information on characteristics at the time of grasping of the target article 14. The information on characteristics at the time of grasping is information, for example, such as being soft, fragile, or deformable. The grasping database includes the grasping-enabled position posture, score information representing easiness of grasping, the amount of depression allowed at the time of grasping, a determination threshold value for grasping determination, and a determination threshold value for error detection, for each grasping method of the end effector. The grasping method is, for example, suction, parallel two-finger, parallel four-finger, and multi-joint.

The environment database includes work stage information corresponding to the robot 21, the motion range of the robot 21, and surrounding environment information representing a surrounding object and the like. The internal database 481 successively updates the databases, in accordance with the contents in the database 312 managed by the data management module 321 of the management system 30.

The handling system 10 as described above can transport the target article 14 to be processed among different kinds of articles 12 to the robot 21 or the operator 23 to allow the robot 21 or the operator 23 to handle the target article 14 and perform a given process.

Article Processing System 50

The article processing system 50 will now be described. The article processing system 50 is an example of the handling system 10 illustrated in FIG. 1 to FIG. 8. In the description of the article processing system 50, the constituent element having substantially the same function and configuration as that of the handling system 10 is denoted by the same reference sign and an overlapping description will be omitted except for differences.

Figure 9:
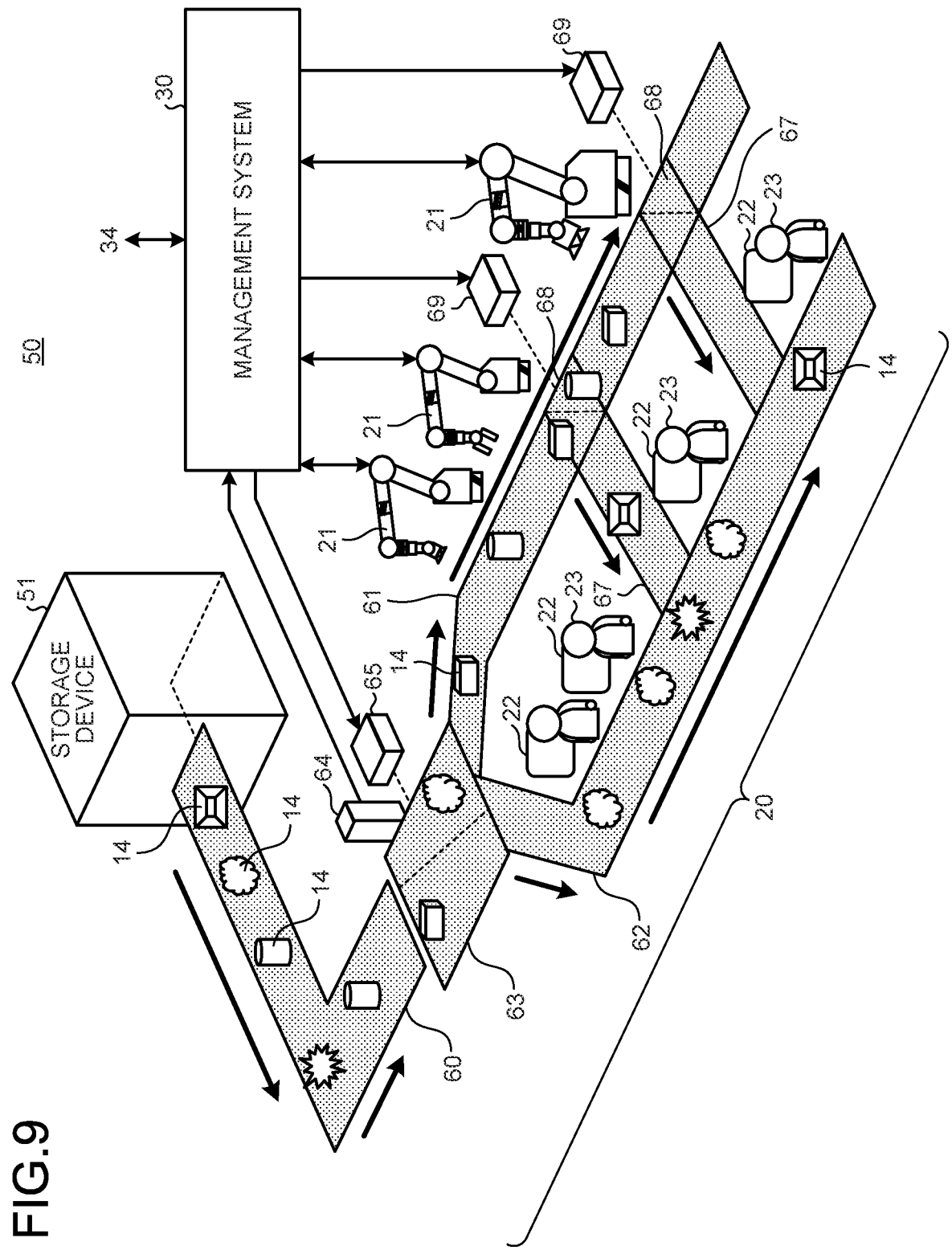
FIG. 9 is a diagram illustrating an article processing system.

FIG. 9 is a diagram illustrating the article processing system 50. The article processing system 50 transports the target article 14 to the robot 21 or the operator 23 with the conveyance system 20 and allows the robot 21 or the operator 23 to handle the target article 14. The article processing system 50 then allows the robot 21 or the operator 23 to perform a given process for the target article 14.

The article processing system 50 includes the management system 30, a storage device 51, the conveyance system 20, the robot 21, and the terminal device 22. The article processing system 50 operates in cooperation with the operator 23. The article processing system 50 may include a plurality of robots 21. The article processing system 50 may include a plurality of terminal devices 22 and operate in cooperation with a plurality of operators 23.

The management system 30 successively specifies the target article 14 to be processed among different kinds of articles 12. For example, the management system 30 receives data that identifies the target article 14 from the high-level system 34, and specifies the article 12 of the kind identified by the received data as the target article 14.

The storage device 51 is an example of the external system 32. The storage device 51 stores different kinds of articles 12. The storage device 51 outputs the target article 14 specified by the management system 30 from among the stored different kinds of articles 12 from the inside and applies the target article 14 to the conveyance system 20.

The conveyance system 20 transports the target article 14 output from the storage device 51 to the work space for the robot 21 or the work space for the operator 23. The conveyance system 20 may transport the target article 14 as it is or may transport the target article 14 contained in a container that is a storage box or placed on a tray.

The robot 21 handles the transported target article 14 and performs a given process when the target article 14 which it is in charge is transported to its work space. The robot 21 receives an instruction from the management system 30 as to which target article 14 it is in charge. The robot 21 performs, as the given process, for example, picking, packing, unloading, loading, unpacking, checking, inspection, processing, or assembly for the target article 14.

The robot 21 is arranged in the vicinity of a conveyance path of a first conveyance device 61. When the article processing system 50 includes a plurality of robots 21, a plurality of robots 21 are arranged along the conveyance path of the first conveyance device 61.

When the article processing system 50 includes a plurality of robots 21, the robots 21 can be of different kinds, and individually handle the target articles 14 of different kinds and perform a given process. For example, a plurality of robots 21 can individually handle target articles 14 of different weights, sizes, or materials. For example, a plurality of robots 21 have end effectors different from each other. For example, a first robot 21-1 of a plurality of robots 21 has a suction-type end effector. A second robot 21-2 of a plurality of robots 21 has a pinch-type end) effector. A third robot 21-3 of a plurality of robots 1 has a hybrid-type end effector. The article processing system 50 thus can handle various kinds of target articles 14 and perform a given process.

The terminal device 22 is held by the operator 23. The operator 23 holds the terminal device 22. The operator 23 handles the transported target article 14 and performs a given process when the target article 14 that he/she is in charge is transported to his/her work space. The operator 23 performs, as the given process, for example, unpacking, packing, processing, or assembly, for the target article 14. When the article processing system 50 operates in cooperation with a plurality of operators 23, a plurality of operators 23 are arranged along a conveyance path of a second conveyance device 62.

The conveyance system 20 includes a common conveyance device 60, the first conveyance device 61, the second conveyance device 62, the distribution device 63, a sensor system 64, a distribution control device 65, a third conveyance device 67, a direction change device 68, and a direction control device 69.

The common conveyance device 60 receives the target article 14 output from the storage device 51 and transports the target article 14 along a conveyance path. As an example, the common conveyance device 60 is a conveyor. When a plurality of target articles 14 are output from the storage device 51, the common conveyance device 60 transports the target articles 14 arranged in a row at given intervals.

The first conveyance device 61 transports the target article 14 to the work space for the robot 21. As an example, the first conveyance device 61 is a conveyor. When a plurality of target articles 14 are output, the first conveyance device 61 transports the target articles 14 arranged in a row. When the article processing system 50 includes a plurality of robots 21, the first conveyance device 61 transports. The target article 14 such that the target article 14 successively passes through the vicinity of the individual work spaces for the robots 21.

The second conveyance device 62 transports the target article 14 to the work space for the operator 23. As an example, the second conveyance device 62 is a conveyor. When a plurality of target articles 14 are output, the second conveyance device 62 transports the target articles 14 arranged in a row. The operator 23 is arranged in the vicinity of a conveyance path of the second conveyance device 62. When the article processing system 50 operates in cooperation with a plurality of operators 23, the second conveyance device 62 transports the target article 14 such that the target article 14 successively passes through the vicinity of the individual work spaces for the operators 23.

The distribution device 63 sends the target article 14 transported by the common conveyance device 60 to the first conveyance device 61 or the second conveyance device 62, in accordance with control by the distribution control device 65. As an example, the distribution device 63 is a conveyor capable of switching positions to which the target article 14 is output, in accordance with control by the distribution control device 65.

The sensor system 64 detects information about the target article 14 transported by the common conveyance device 60. The sensor system 64 may include different kinds of sensors. The sensor system 64 applies the detected information to the management system 30. For example, the sensor system 64 detects the article identification (ID) of the target article 14. For example, the sensor system 64 may be a barcode reader or an optical character recognition device that scans the article ID printed on the target article 14. The sensor system 64 may detect the ID of a container containing the target article 14 or a tray loaded with the target article 14. For example, the sensor system 64 may capture an image of the target article 14 to generate an RGB image or a depth image. Furthermore, the sensor system 64 may measure the weight of the target article 14.

The sensor system 64 may include a sensor installed on the upstream side (for example, closer to the storage device 51) of the common conveyance device 60. Arranging a sensor on the upstream side can increase the time taken for the management system 30 to analyze the target article 14. The management system 30 thus can start control of the distribution device 63 at earlier timing and eliminates the staying of the target article 14 in the common conveyance device 60.

The distribution control device 65 controls the operation of the distribution device 63, in accordance with an instruction from the management system 30.

The third conveyance device 67 sends the target article 14 transported by the first conveyance device 61 to the second conveyance device 62. As an example, the third conveyance device 67 is a conveyor. The article processing system 50 may include a plurality of third conveyance devices 67.

The direction change device 68 is provided in the middle or at the final stage of the conveyance path of the first conveyance device 61. In normal times, the direction change device 68 operates such that the target article 14 transported by the first conveyance device 61 is transported along the conveyance path of the first conveyance device 61. However, when receiving a change instruction from the direction control device 69, the direction change device 68 changes the conveyance path of the first conveyance device 61 to send the target article 14 transported by the first conveyance device 61 to the third conveyance device 67. As an example, the direction change device 68 is a conveyor capable of switching positions to which the target article 14 is output, in accordance with control by the direction control device 69.

When the article processing system 50 includes a plurality of third conveyance devices 67, the article processing system 50 includes a plurality of direction change devices 68. A plurality of direction change devices 68 correspond one-to-one to a plurality of third conveyance devices 67.

The direction control device 69 controls the operation of the direction change device 68, in accordance with an instruction from the management system 30. When the article processing system 50 includes a plurality of third conveyance devices 67, the article processing system 50 includes a plurality of direction control devices 69. A plurality of direction control devices 69 correspond one-to-one to a plurality of third conveyance devices 67.

The management system 30 manages the target article 14 output from the storage device 51. The management system 30 manages the timing when the target article 14 is output from the storage device 51 and the timing when the target article 14 reaches the robot 21 or the operator 23.

Furthermore, the management system 30 determines whether the robot 21 is able to handle the target article 14 and perform a given process. When the robot 21 is able to handle the target article 14 and perform a given process, the management system 30 controls the conveyance system 20 such that the target article 14 output from the storage device 51 is transported to the work space for the robot 21 in charge of the process. When the robot 21 is unable to handle the target article 14 and perform a given process, the management system 30 controls the conveyance system 20 such that the target article 14 output from the storage device 51 is transported to the work space for the operator 23 in charge of the process. With such control, the management system 30 can allow the robot 21 and the operator 23 to efficiently cooperate with each other.

The robot 21 may sometimes be unable to handle due to occurrence of some error or due to a state of the target article 14 or variations in characteristics. In this case, the robot 21 is unable to perform a given process for the target article 14. In this case, the management system 30 receives a notice from the robot 21 and controls the conveyance system 20 such that the target article 14 unable to be processed by the robot 21 is transported to the work space for the operator 23. The management system 30 then allows the operator 23 to execute a process on the target article 14 unable to be processed by the robot 21. The management system 30 thus ensures that all kinds of target articles 14 are handled and subjected to a given process.

The first conveyance device 61 and the second conveyance device 62 are arranged such that their conveyance paths are parallel to each other and positioned nearby. The operator 23 thus can work in the vicinity of the robot 21. When any robot 21 of a plurality of robots 21 is stopped due to an error, the management system 30 transmits an instruction for recovery to the terminal device 22 held by the operator 23 working in the vicinity of the robot 21 stopped due to an error. The operator 23 thus can check the state of the stopped robot 21 and, for example, restart the robot 21.

The article processing system 50 may transport a container containing a plurality of target articles 14 or a tray loaded with a plurality of target articles 14. In this case, the robot 21 and the operator 23 can handle a plurality of target articles 14 simultaneously and perform a given process.

Figure 10:
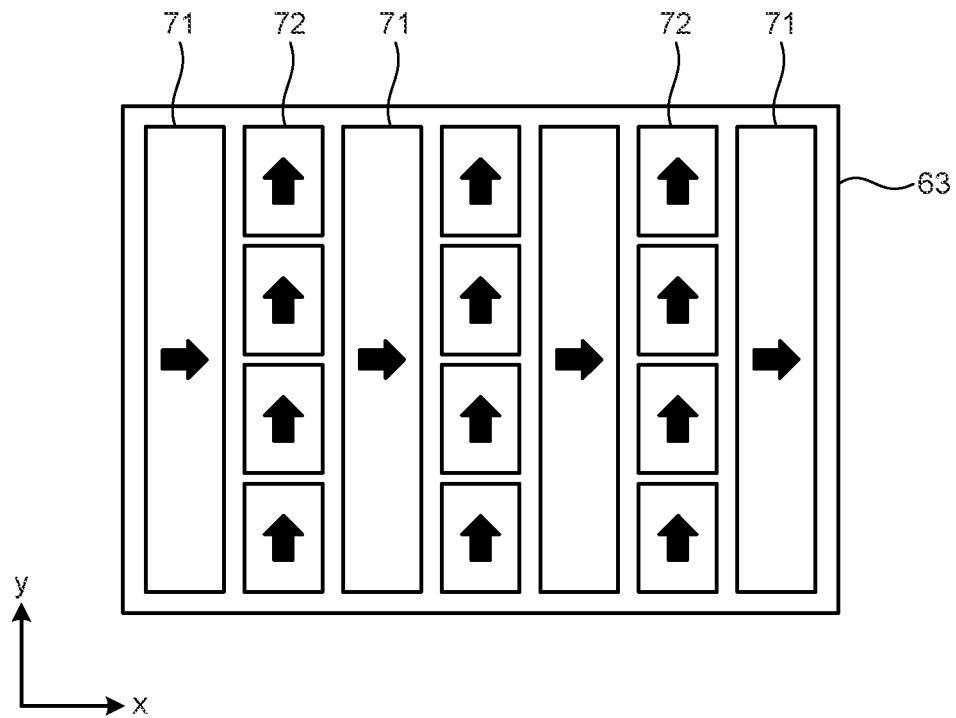
FIG. 10 is a diagram illustrating a distribution device according to a first example.

FIG. 10 is a diagram illustrating the distribution device 63 according to a first example. The distribution device 63 according to the first example includes a plurality of first rollers 71 and a plurality of second rollers 72. Each of the first rollers 71 rotates to transport the target article 14 in a first direction (x direction). Each of the second rollers 72 rotates to transport the target article 14 in a second direction (y direction) vertical to the first direction.

In the first example, a plurality of first rollers 71 and a plurality of second rollers 72 are alternately arranged with respect to the x direction. In a first mode, a plurality of first rollers 71 according to the first example have a higher contact position with the target article 14 than the second rollers 72. In the first mode, the second rollers 72 therefore are not in contact with the target article 14. With this configuration, in the first mode, the distribution device 63 according to the first example can transport the target article 14 in the x direction.

In a second mode, the first roller 71 and the second roller 72 according to the first example are at the same height. In the second mode, both of the first roller 71 and the second roller 72 are in contact with the target article 14. With this configuration, in the second mode, the distribution device 63 can transport the target article 14 in a direction at a given angle between the x direction and the y direction. Such a distribution device 63 according to the first example can output the target article 14 from different positions in the y direction between the first mode and the second mode.

Figure 11:
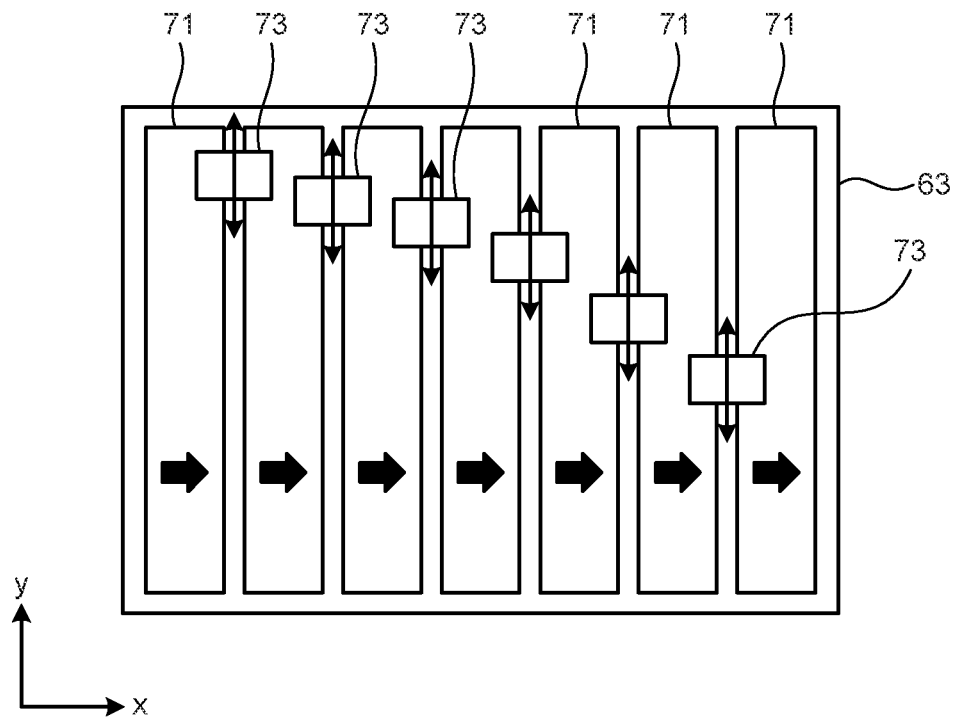
FIG. 11 is a diagram illustrating the distribution device according to a second example.

FIG. 11 is a diagram illustrating the distribution device 63 according to a second example. The distribution device 63 according to the second example includes a plurality of first rollers 71 and a plurality of restraining members 73.

In the second example, a plurality of first rollers 71 are arranged to be aligned in the x direction. Each of the restraining members 73 is arranged between adjacent two first rollers 71 and is movable in the y direction. Each of the restraining members 73 restrains the movement of the target article 14 moving in the x direction. The individual positions in the y direction of the restraining members 73 are set appropriately so that the target article 14 can move in the y direction as the target article 14 moves in the x direction. In the distribution device 63 according to the second example, the individual positions in the y direction of the restraining members 73 change between the first mode and the second mode. With such a configuration, the distribution device 63 according to the second example can output the target article 14 from different positions in the y direction between the first mode and the second mode.

Figure 12:
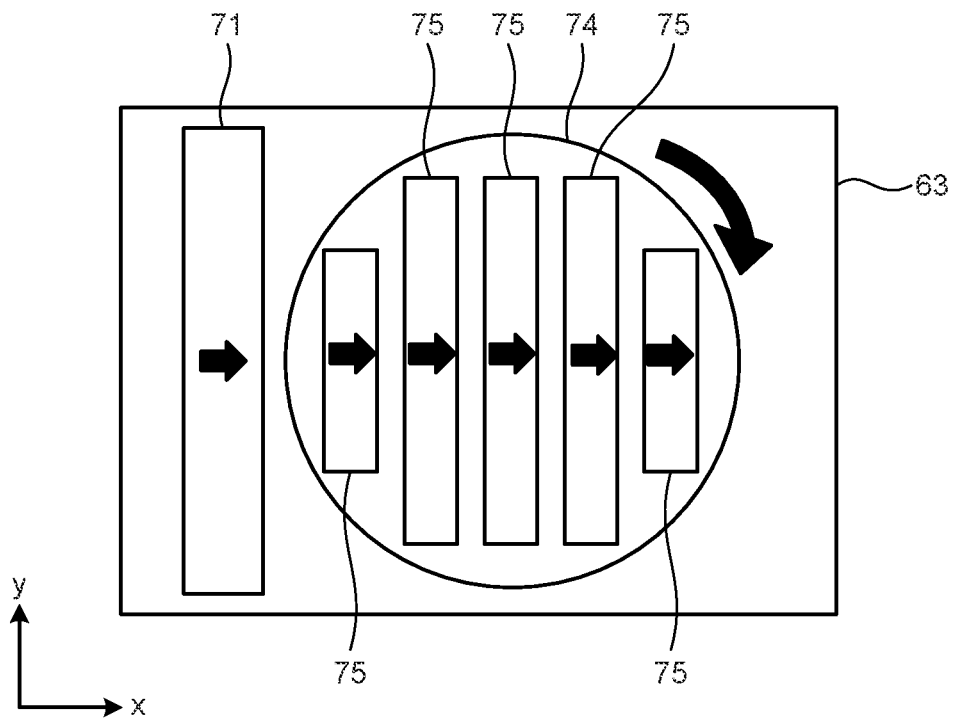
FIG. 12 is a diagram illustrating the distribution device according to a third example.

FIG. 12 is a diagram illustrating the distribution device 63 according to a third example. The distribution device 63 according to the third example includes a first roller 71 and a rotary stage 74.

The first roller 71 sends the target article 14 input from the upstream side to the rotary stage 74. The rotary stage 74 can rotate around an axis perpendicular to the x direction and the y direction. The rotary stage 74 includes a plurality of rollers 75 on its upper surface. A plurality of rollers 75 rotate to transport the target article 14 in a given direction in the rotary stage 74. In the distribution device 63 according to the third example, the rotating position of the rotary stage 74 differs between the first mode and the second mode. With this configuration, the distribution device 63 according to the third example can output the target article 14 from different positions in the y direction between the first mode and the second mode.

Figure 13:
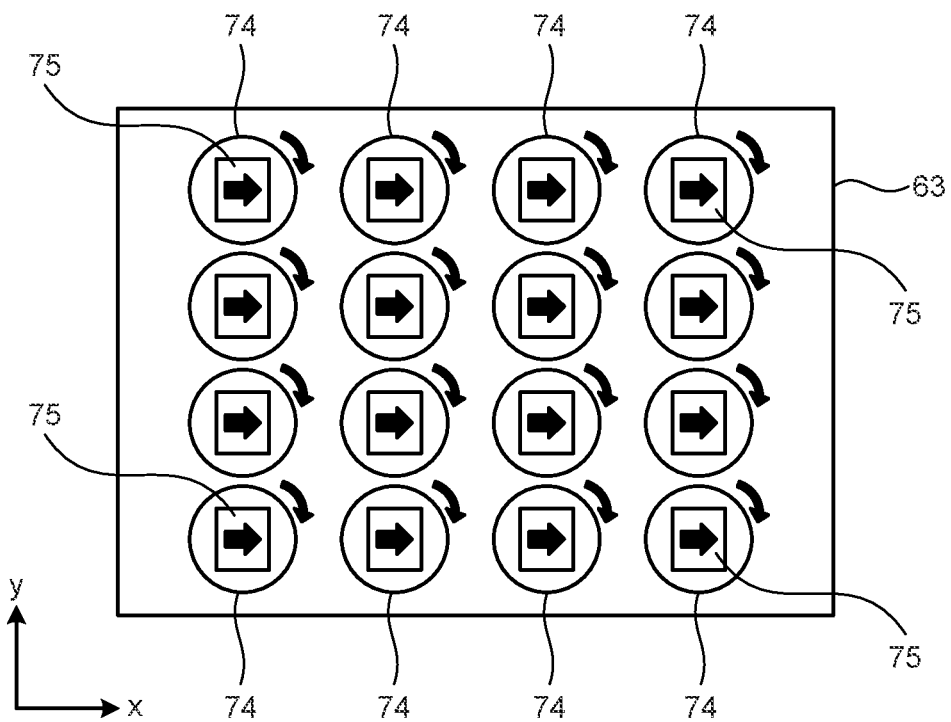
FIG. 13 is a diagram illustrating the distribution device according to a fourth example.

FIG. 13 is a diagram illustrating the distribution device 63 according to a fourth example. The distribution device 63 according to the fourth example includes a plurality of rotary stages 74.

A plurality of rotary stages 74 are arranged in rows and columns with respect to the x direction and the y direction. Each of the rotary stages 74 includes a roller 75 on its upper surface. The roller 75 rotates to transport the target article 14 in a given direction in the rotary stage 74. In the distribution device 63 according to the fourth example, the individual rotating positions of the rotary stages 74 differ between the first mode and the second mode. With this configuration, the distribution device 63 according to the fourth example can output the target article 14 from different positions in the y direction between the first mode and the second mode.

The article processing system 50 can include the distribution device 63 according to the first example to the fourth example illustrated in FIG. 10 to FIG. 13. The article processing system 50 may include the distribution device 63 of another configuration adapted to the characteristics such as size and material of the target article 14, in place of the distribution device 63 according to the first example to the fourth example. Although FIG. 9 illustrates an example of the distribution to two paths, the article processing system 50 with a higher processing speed can be constructed with distribution to three or more paths. In this case, the switching angle and the switching position of the distribution device 63 according to the first example to the fourth example illustrated in FIG. 10 to FIG. 13 can be divided into three or more to enable distribution to three or more paths. Alternatively, a plurality of distribution devices 63 may be arranged to enable distribution to three or more paths.

FIG. 14 is a diagram illustrating an example of information managed by the management system 30. The management system 30 manages registration information and process information as illustrated in FIG. 14 with a database, for each kind of article 12.

The registration information is set for each kind of article 12. The registration information includes, as an example, article ID, item number, item name, SKU number, SKU information, category, outer shape information, article weight, handling information, and description information.

The article ID is an identifier allocated for each kind of article 12. The kind of article 12 may be a stock keeping unit (SKU) which is a unit of inventory management.

The item number is a number allocated for each item. The item is a management unit of article 12. The item name is the name representing the item of article 12.

The SKU number is a number allocated for identifying the SKU. The SKU information is information indicating the content of the SKU, such as color or size of article 12. The category is information indicating the category of article 12 (for example, scissors, frying pan, or T-shirt).

The outer shape information is information indicating the outer shape size of article 12, such as the dimensions of three sides. The article weight is information indicating the weight of article 12. The handling information is caution information concerning the handling of article 12, such as fragile article 12 or dangerous article 12. The description information is information indicating a brief description of article 12.

The process information is information generated based on the result of handling and processing by the robot 21 in the past for the article 12, an article of the same kind as the article 12, or an article in the same category classified according to dimensions, size, the presence/absence of package, the material of package, the material of the article itself, and the like. The handling in this case includes not only the handling performed in the same environment but also using the result in different work places, using the result of processing an article on arrival at the time of shipping, and the result of to in a factory at the time of development of robots. In the process information, some initial value may be described by default. When the robot 21 handles and processes the article 12 or an article of the same kind or in the same category, the management system 30 updates the process information.

The process information includes a handling method, a robot list, and track record information.

The handling method is information indicating whether the article 12 is to be processed by the operator 23 or the article 12 is to be processed by the robot 21. When whether the article 12 is to be processed by the operator 23 or by the robot 21 is not yet defined, Unknown is entered.

The robot list is a list indicating parameters related to a process, such as the robot 21 capable of processing the article 12, and a grasping method, speed, and grasping force of the robot appropriate for the process. As used herein, the grasping method refers to specifying the kind of grasping of a robot capable of different kinds of grasping, such as suction and pinching, or specifying a variation in settings, such as the number of suction pads used in sucking. The track record information is information indicating history of processing, the number of processing successes, and the number of processing failures for the each robot 21.

Every time a new kind of article 12 is stored into the storage device 51, the management system 30 acquires necessary information, for example, from the high-level system 34, and generates and stores registration information and process information. Every time an article 12 of some kind is handled by the robot 21, the management system 30 updates the process information. FIG. 14 illustrates a case where registration information and process information of all the articles are stored in a database in the same manner. However, only the registration information may be stored in an item, and the process information may be used by invoking the process information separately stored and associated for each kind or category. The process information can be stored not only in the form of a list but also as an estimator having a filter structure such as a neural network or parameters of an estimator. With input of the category of a product, the estimator can output a suitable grasping method and its reliability and therefore can be used for selecting an optimum handling method, in the same manner as the process information described in the form of a list.

When the article 12 is contained in a container or placed on a tray, the management system 30 manages the ID of the container or the tray and the article ID in association with each other. The management system 30 thus can identify the kind of article 12 contained in the container or the article 12 placed on the tray by detecting the ID of the container or the tray. In this way, since the registration information representing the characteristics of the article itself and the process information that is information in processing the article are stored in the form of a database, the management system 30 can select a robot or an operator of a suitable type in advance. Furthermore, the management system 30 can select a robot or an operator of the type more appropriate for a product of the same kind or in the same category as those processed with the process information in the past or those processed in the past. As a result, the handling system 10 can implement an efficient process with a higher ratio of automation.

Figure 15:
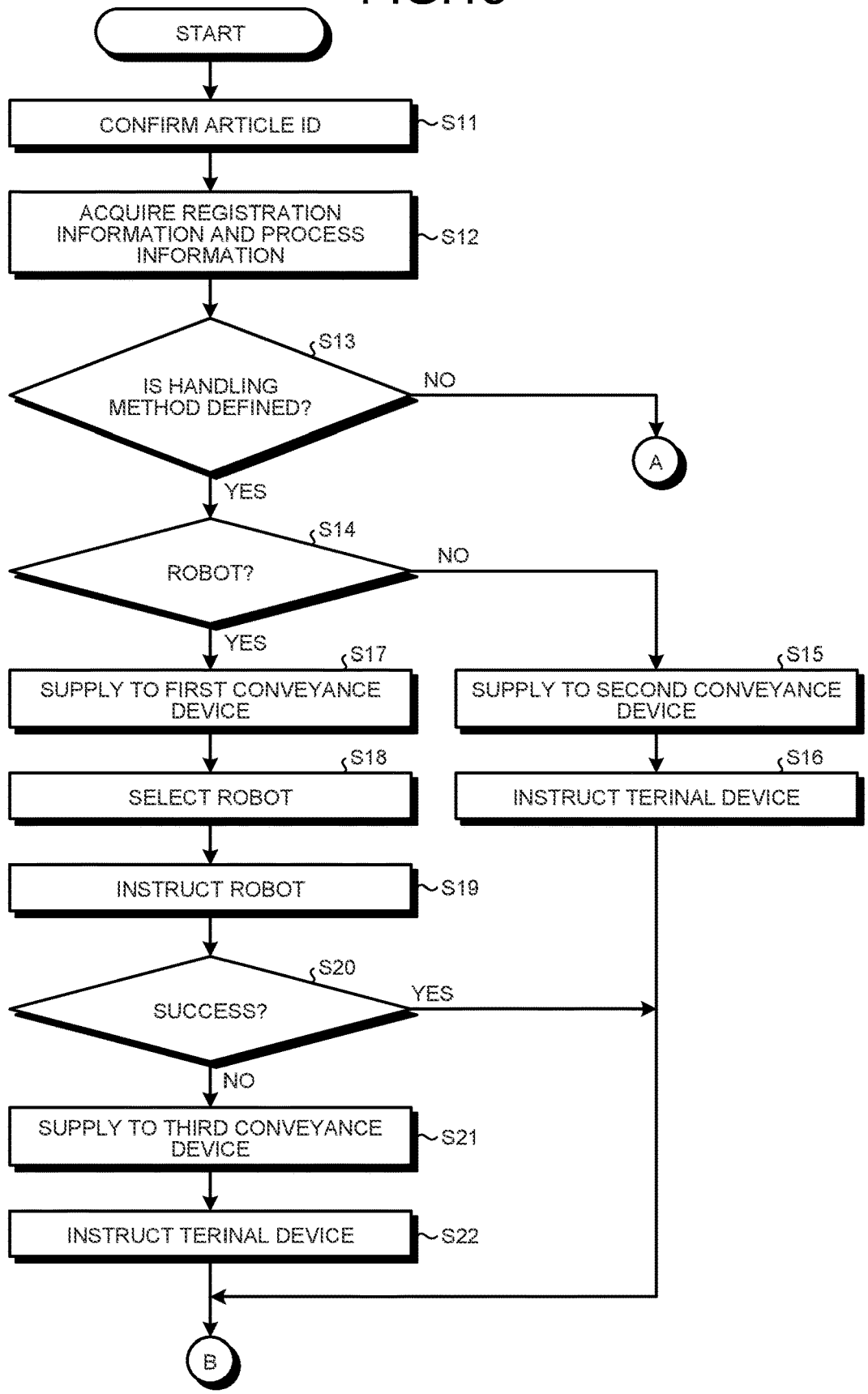
FIG. 15 is a flowchart illustrating a process of the article processing system for a target article.
Figure 16:
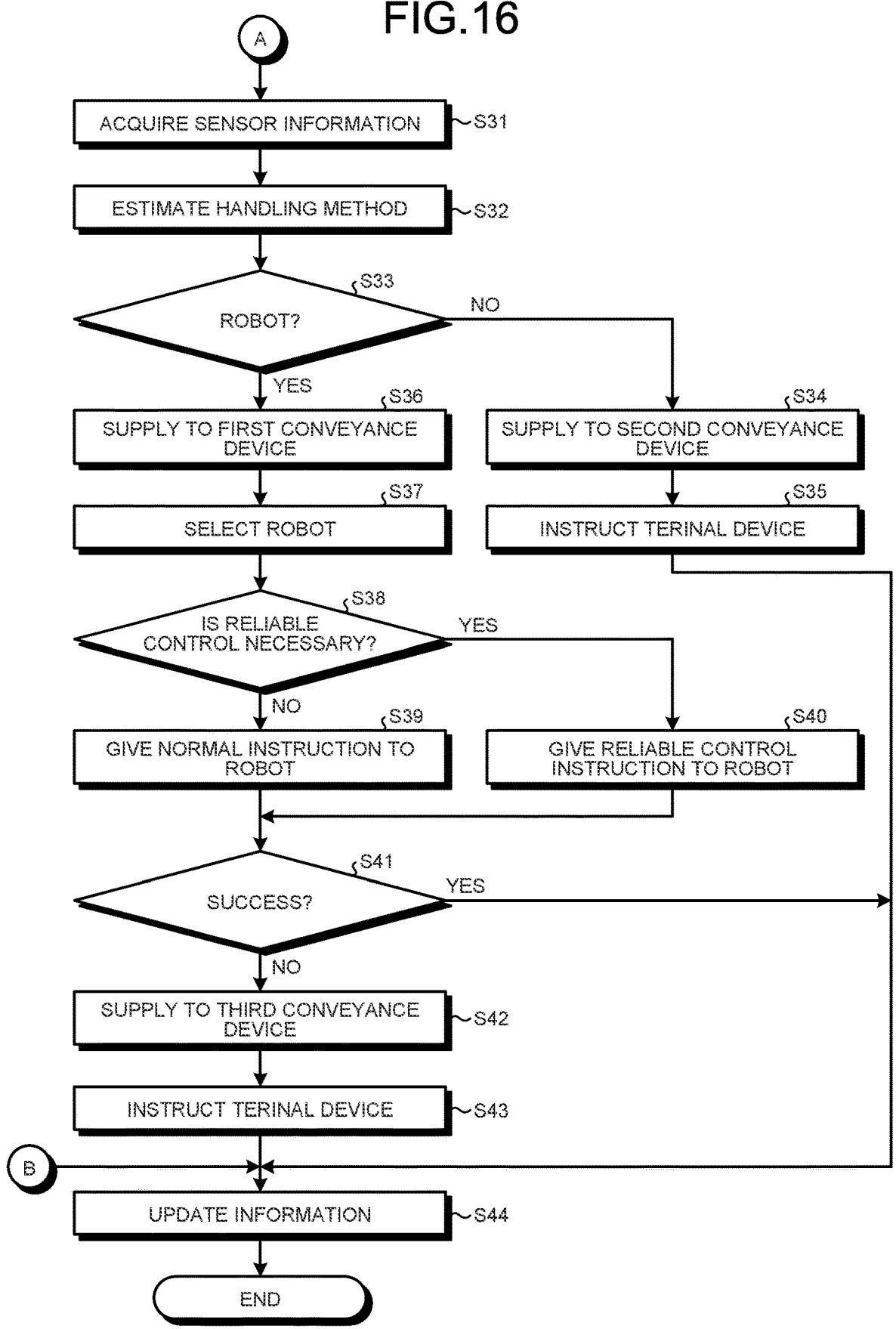
FIG. 16 is a flowchart continued from FIG. 15.

FIG. 15 is a flowchart illustrating a process of the article processing system 50 for the target article 14. FIG. 16 is a flowchart continued from FIG. 15. The article processing system 50 executes the process illustrated in FIG. 15 and FIG. 16, for each target article 14 transported in the conveyance system 20.

The article processing system 50 starts the process from 311 before the target article 14 reaches the distribution device 63.

First of all, at S11, the management system 30 detects the article ID of the target article 14, based on information detected by the sensor system 64. For example, the management system 30 acquires print information printed on the target article 14 from the sensor system 64 and detects the article ID based on the acquired information. The management system 30 may acquire the ID of the container containing the target article 14 or the tray loaded with the target article 14 and acquire the article ID associated with the ID of the container or the tray. Alternatively, the management system 30 may acquire a captured image of the target article 14 or the weight of the target article 14 from the sensor system 64 and perform image recognition and an estimation process based on the acquired information to detect the article ID.

Subsequently, at S12, the management system 30 acquires the article information and the process information associated with the detected article ID. When part of the article information and the process information is stored in the high-level system 34, the management system 30 acquires necessary information from the high-level system 34.

Subsequently, at S13, the management system 30 refers to the entry of handling method included in the acquired process information and determines whether the handling method of the target article 14 is defined, if the operator 23 or the robot 21 is entered in the entry of handling method included in the acquired process information, the management system 30 determines that the handling method is defined. If Unknown is entered in the entry included in the acquired process information, the management system 30 determines that the handling method is not yet defined. When the article ID fails to be detected or when there exists no process information associated with the detected article ID, the management system 30 determines that the handling method is not yet defined. Even when robot 21 is entered in the entry of handling method, the management system 30 determines that the handling method is not yet defined, if the entry of robot list in the process information does not include any robot 21 of the article processing system 50.

If the handling method for the target article 14 is defined (Yes at S13), the management system 30 proceeds to S14. If the handling method for the target article 14 is riot yet defined (No at S13), the management system 30 proceeds to S31 in FIG. 16.

At S14, the management system 30 determines whether the handling method is the robot 21. If the handling method is not robot 21, that is, if the handling method is operator 23 (No at S14), the management system 30 proceeds to S15. If the handling method is the robot 21 (Yes at S14), the management system 30 proceeds to S17.

At S15, the management system 30 gives an instruction to the distribution control device 65 to send the target article 14 to the second conveyance device 62. Upon receiving the instruction from the management system 30, the distribution control device 65 controls the transportation operation of the distribution device 63 to send the target article 14 to the second conveyance device 62 at a timing when the target article 14 reaches the distribution device 63. The distribution device 63 then sends the target article 14 to the second conveyance device 62, in accordance with control by the distribution control device 65. Thus, the target article 14 to be handled and processed by the operator 23 is sent by the distribution device 63 from the common conveyance device 60 to the second conveyance device 62.

At S16, the management system 30 gives an instruction to the terminal device 22 held by the operator 23 to perform a given process for the target article 14 having the article ID detected at S11. When a plurality of operators 23 exist, the management system 30 decides on one operator 23 in charge and gives an instruction to the terminal device 22 held by the decided operator 23. The terminal device 22 receiving the instruction presents the content of the instruction received from the management system 30 to the operator 23. The operator 23 holding the terminal device 22 presenting the instruction content handles the target article 14 transported by the second conveyance device 62 and performs a process in accordance with the instruction content for the handled target article 14. If the process at S16 is finished, the management system 30 proceeds to S44 in FIG. 16.

At S17, the management system 30 gives an instruction to the distribution control device 65 to send the target article 14 to the first conveyance device 61. Upon receiving the instruction from the management system 30, the distribution control device 65 controls the transportation operation of the distribution device 63 to send the target article 14 to the first conveyance device 61 at a timing when the target article 14 reaches the distribution device 63. The distribution device 63 then sends the target article 14 to the first conveyance device 61, in accordance with control by the distribution control device 65. Thus, the target article 14 to be handled and processed by the robot 21 is sent by the distribution device 63 from the common conveyance device 60 to the first conveyance device 61.

Subsequently, at S18, the management system 30 selects a robot 21 for performing a given process for the target article 14 from among a plurality of robots 21. For example, the management system 30 selects any one robot 21 included in the entry of robot list in the process information from among a plurality of robots 21.

Subsequently, at S19, the management system 30 gives an instruction to the robot 21 selected at S18 to perform a given process for the target article 14. The robot 21 receiving the instruction handles the target article 14 transported by the first conveyance device 61 and performs a process in accordance with the instruction content for the handled target article 14.

Subsequently, at S20, the management system 30 determines whether the process for the target article 14 by the robot 21 is successful. If the process is successful (Yes at S20), the management system 30 proceeds to S44 in FIG. 16. If the process is failed (No at S20), the management system 30 proceeds to S21.

At S21, the management system 30 specifies the direction change device 68 positioned downstream from the robot 21 that has performed the process for the target article 14. The management system 30 then gives an instruction to the direction control device 69 controlling the specified direction converter 66 to send the target article 14 to the third conveyance device 67.

Upon receiving the instruction from the management system 30, the direction control device 69 controls the transportation operation off the direction converter 66 to send the target article 14 to the third conveyance device 67 at a timing when the target article 14 reaches the direction converter 66. When receiving an instruction from the management system 30, the direction control device 69 sends the target article 14 from the first conveyance device 61 to the third conveyance device 67. The target article 14 that has not undergone a given process by the robot 21 is therefore sent to the third conveyance device 67. The third conveyance device 67 then receives the target article 14 that has not undergone a given process by the robot 21 from the first conveyance device 61 and sends the received target article 14 to the second conveyance device 62.

Subsequently, at S22, the management system 30 gives an instruction to the terminal device 22 held by the operator 23 to perform a given process for the target article 14. When a plurality of operators 23 exist, the management system 30 decides on the operator 23 arranged at a position where the target article 14 can be handled, as a person in charge of recovery, and gives an instruction to the terminal device 22 held by the operator 23 decided as a person in charge of recovery. For example, the management system 30 decides on the operator 23 located downstream from an output end of the third conveyance device 67, as a person in charge of recovery. The terminal device 22 receiving the instruction presents the content of the instruction received from the management system 30 to the operator 23. The operator 23 holding the terminal device 22 presenting the instruction content handles the target article 14 transported by the second conveyance device 62 and performs a process in accordance with the instruction content for the handled target article 14. If the process at S22 is finished, the management system 30 proceeds to S44 in FIG. 16.

On the other hand, at S31 in FIG. 16, the management system 30 acquires sensor information about the target article 14 detected by the sensor system 64. For example, the management system 30 acquires an RGB image or a depth image by capturing an image of the target article 14. The management system 30 may acquire weight information. indicating the weight of the target article 14. When sufficient sensor information has already been acquired at S11, the management system 30 need not perform the process at S31.

Subsequently, at S32, the management system 30 estimates an appropriate handling method, based on the sensor information and the registration information. Specifically, the management system 30 estimates which of the robot 21 and the operator 23 is appropriate for handling and processing. If it is estimated that handling and processing by the robot 21 is appropriate, the management system 30 further estimates which robot 21 of a plurality of robots 21 is appropriate for handling and processing. For example, the management system 30 estimates which of the suction-type end effector, the pinch-type effector, or the hybrid-type effector is appropriate, based on the shape, material, and the like of the target article 14. The management system 30 further generates the reliability of the estimation result.

For example, the management system 30 estimates an appropriate handling method, using an estimator including a neural network trained by deep learning. In this case, the neural network is trained, based on the result of handling and processing of the target article 14 by the robot 21 in the past. Such an estimator can estimate a handling method with high reliability, for example, when an article 12 of the same kind as the target article 14 but with a different color has been processed successfully by the robot 21 in the past. Such an estimator can estimate a handling method with high reliability, for example, when an article 12 having a weight close to that of the target article 14 and in the same category has been processed successfully by the robot 21 in the past.

Subsequently, at S33, the management system 30 determines whether to allow the robot 21 to handle and process the target article 14. If the operator 23 is estimated as an appropriate handling method, the management system 30 determines not to allow the robot 21 to handle the target article 14, that is, to allow the operator 23 to handle and process the target article 14 (No at S33). Furthermore, even when the robot 21 is estimated as an appropriate handling method, if the reliability is lower than a given threshold value, the management system 30 determines not to allow the robot 21 to handle the target article 14, that is, to allow the operator 23 to handle the target article 14 (No at. S33). If the reliability is equal to or greater than a given threshold value and the robot 21 is estimated as an appropriate handling method, the management system 30 determines to allow the robot 21 to handle and process the target article 14 (Yes at S33).

If it is determined to allow the operator 23 to handle and process the target article 14 (No at S33), the management system 30 proceeds to S34. If it is determined to allow the robot 21 to handle and process the target article 14 (Yes at S33), the management system 30 proceeds to S36.

At S34, the management system 30 executes a process similar to S15. The target article 14 to be handled and processed by the operator 23 is sent by the distribution device 63 from the common conveyance device 60 to the second conveyance device 62.

Subsequently, at S35, the management system 30 executes a process similar to S16. The operator 23 thus handles the target article 14 transported by the second conveyance device 62 and performs a process in accordance with the instruction content for the handled target article 14. If the process at S35 is finished, the management system 30 proceeds to S44.

At S36, the management system 30 executes a process similar to S17. The target article 14 to be handled and processed by the robot 21 is thus sent by the distribution device 63 from the common conveyance device 60 to the first conveyance device 61.

Subsequently, at S37, the management system 30 selects a robot 21 for performing a given process for the target article 14 from among a plurality of robots 21. For example, the management system 30 selects any one robot 21, based on the estimation result at S32.

Subsequently, at S38, the management system 30 determines whether reliable control by the robot 21 is necessary. For example, the robot 21 can operate in a normal operation mode in which the target article 14 is handled and processed as usual and in a stable operation mode in which the target article 14 is handled and processed more reliably than in the normal operation mode.

If the reliability of the estimation process of estimating whether the target article 14 is to be handled by the robot 21 or handled by the operator 23 is equal to or smaller than a given value, the management system 30 determines that reliable control by the robot 21 is necessary. For example, if the reliability of the estimation process for selecting which robot 21 is to handle from among a plurality of robots 21 is equal to or smaller than a given value, the management system 30 also determines that reliable control by the robot 21 is necessary. That is, when the robot 21 is allowed to handle the target article 14 and the reliability of estimation as to whether the target article 14 is to be handled by the robot 21 or handled by the operator 23 is equal to or smaller than a given value. The management system 30 allows the robot 21 to operate in the stable operation mode.

If it is determined that reliable control by the robot 21 is not necessary (No at S38), the management system 30 proceeds to S39. If it is determined that reliable control by the robot 21 is necessary (Yes at S38), the management system 30 proceeds to S40.

At S39, the management system 30 performs a process similar to S19. The robot 21 receiving the instruction thus can handle the target article 14 in the normal operation mode and perform a given process for the handled target article 14. If the process at S39 is finished, the management system 30 proceeds to S41.

At S40, the management system 30 gives an instruction to the robot 21 selected at S37 to perform a given process for the target article 14 under more reliable control than in the normal operation. The robot 21 receiving such an instruction handles the target article 14 and performs a given process in the stable operation mode. For example, the robot 21 receiving such an instruction performs a given process, for example, in a slower motion than in the normal operation. For example, the robot 21 may perform a process so as not to destroy or deform the target article 14 by lowering a determination threshold value for force control, compared with in the normal operation. For example, the robot 21 may increase the number of times an image of the target article 14 is captured during a process, compared with in the normal operation.

With this process, the robot 21 can improve the success ratio although the speed is lower or the power consumption is larger than in the normal operation. The robot 21 may learn a process for a case where a target article 14 of the same kind is handled next time, based on the operation in the stable operation mode. If the process at 540 is finished, the management system 30 proceeds to S41.

Subsequently, at S41, the management system 30 determines whether the process for the target article 14 by the robot 21 is successful. If the process is successful (Yes at S40), the management system 30 proceeds to S44. If the process is failed (No at S41), the management system 30 proceeds to S42.

At S42, the management system 30 performs a process similar to S21. The third conveyance device 67 thus can receive the target article 14 that has not undergone a given process by the robot 21 from the first conveyance device 61 and send the received target article 14 to the second conveyance device 62.

Subsequently, at S43, the management system 30 performs a process similar to S22. The operator 23 thus can handle the target article 14 that has not undergone a given process by the robot 21 and execute a process accordance with the instruction content for the handled target article 14. If the process at S43 is finished, the management system 30 proceeds to S44.

At S44, the management system 30 updates the process information of the article ID corresponding to the target article 14, based on the content and the result of the process for the target article 14 by the robot 21. For example, the management system 30 receives the content and the result of the process transmitted form the robot 21 and updates the track record information included in the process information. The management system 30 may update the process information of the article ID corresponding to the target article 14, based on the content and the result of the process for the target article 14 by the operator 23. In this case, the operator 23 inputs the content and the result of the process to the terminal device 22. The management system 30 then receives the content and the result of the process from the terminal device 22 and updates the track record information included in the process information.

The management system 30 may update the handling method and the robot list included in the process information, in accordance with updating of the track record information. For example, when robot 21 is entered as the handling method but the number of processing failures is a given number or more, the management system 30 deletes the corresponding robot 21 from the robot list or changes the handling method to Unknown. When the number of processing successes a given number or more in a state in which Unknown is entered as the handling method, the management system 30 may include the robot 21 into the robot list and change the handling method to robot 21.

The management system 30 may update the estimator for estimating a handling method and the estimator estimating which robot 21 to be selected from among a plurality of robots 21, based on the content and the result of the process transmitted from the robot 21. The management system 30 thus can improve the reliability in estimation of a handling method and the reliability in estimation as to which of robots 21 is to be selected, in a case where the target article 14 is an article 12 of the same kind next time and later.

If the process at 344 is finished. The management system 30 terminates this flow for the target article 14.

As described above, the article processing system 50 transports the target article 14, and the robot 21 or the operator 23 handles the transported target article 14. Furthermore, in the article processing system 50, the robot 21 or the operator 23 performs a given process for the target article 14. The article processing system 50 then determines which one of the robot 21 or the operator 23 is to process the target article 14, based on the process information generated based on the result of handling and processing of the target article 14 by the robot 21 in the past. The determination using the process information and the updating of the process information are performed at a plurality of steps in the entire process.

The article processing system 50 thus can allow the robot 21 and the operator 23 to cooperate with each other efficiently while reducing the burden of determination and processing by the operator 23. In addition, the article processing system 50 can perform determination and processing more reliably as the number of times the robot 21 handles increases.

Receiving and Shipping System 80

A receiving and shipping system 80 will now be described. The receiving and shipping system 80 is an example of the handling system 10 illustrated in FIG. 1 to FIG. 8. In the description of the receiving and shipping system 80, the constituent element having substantially the same function and configuration as that of the handling system 10 and the article processing system 50 illustrated in FIG. 9 is denoted by the same reference sign and an overlapping description will be omitted except for differences.

Figure 17:
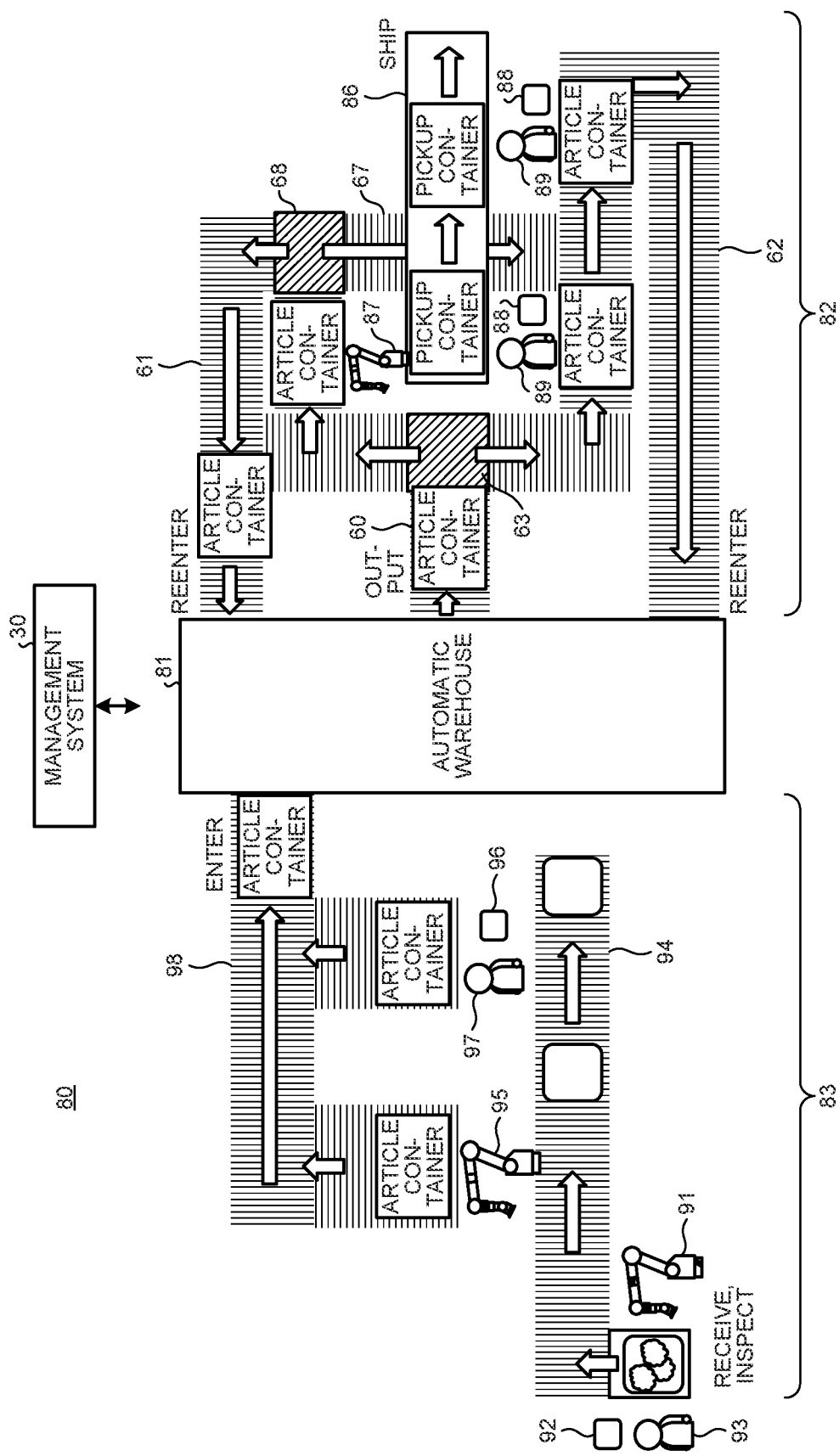
FIG. 17 is a diagram illustrating a receiving and shipping system.

FIG. 17 is a diagram illustrating the receiving and shipping system 80. The receiving and shipping system 80 is applied to, for example, a logistics center. The receiving and shipping system 80 receives and stores different kinds of articles 12 and ships the target article 14 under a shipment instruction among different kinds of articles 12 stored.

The receiving and shipping system 80 includes an automatic warehouse 81, a shipping system 82, a receiving system 83, and a management system 30.

The automatic warehouse 81 is an example of the external system 32. The automatic warehouse 81 stores a plurality of article containers. Each of the article containers contains one or more articles 12 of the same kind. The automatic warehouse 81 receives an article container containing an article 12 on arrival, moves the article container to a specified place in the inside with a crane or the like, and stores the article container. The automatic warehouse 81 removes the article container containing the target article 14 specified by a shipment instruction with a crane or the like and outputs the removed article container to the outside.

When receiving a shipment instruction, the shipping system 82 receives an article container containing the target article 14 indicated by the shipment instruction from the automatic warehouse 81. Subsequently, the shipping system 82 removes a number of target articles 14 contained in the received article container as indicated by the shipment instruction and transfers the removed target articles 14 into a pickup container. The shipping system 82 performs a process of shipping the target articles 14 contained in the pickup container and returns the article container to the automatic warehouse 81 to store the article container again.

The shipping system 82 has substantially the same configuration as the article processing system 50 illustrated in FIG. 9. However, the shipping system 82 differs from the article processing system 50 in that it further includes a fourth conveyance device 66. The fourth conveyance device 86 transports a pickup container containing the target articles 14 to be shipped.

The shipping system 82 also includes a shipment robot 87 as the robot 21 in the article processing system 50. The shipment robot 87 removes the target article 14 from the article container conveyed by the first conveyance device 61 in accordance with an instruction by the management system 30 and puts the removed target article 14 into a pickup container.

The shipping system 82 also has a shipment terminal device 88 as the terminal device 22 in the article processing system 50. The shipping system 82 operates in cooperation with a shipment operator 89 as the operator 23 in the article processing system 50. The shipment terminal device 88 displays an instruction to the shipment operator 89 by The management system 30. The shipment operator 89 removes the target article 14 from the article container transported by the second conveyance device 62 and puts the removed target article 14 into a pickup container, in accordance with an instruction displayed on the shipment terminal device 88.

The first conveyance device 61 performs substantially the same operation as the article processing system 50 illustrated in FIG. 9. Furthermore, after the shipment robot 87 removes the target article 14, the first conveyance device 61 returns the article container to the automatic warehouse 81 and puts it into storage again. The second conveyance device 62 performs substantially the same operation as the article processing system 50 illustrated in FIG. 9. Furthermore, after the shipment operator 89 removes the target article 14, the second conveyance device 62 returns the article container to the automatic warehouse 81 and puts it into storage again.

The receiving system 83 receives an article 12 on arrival and performs a receiving process and an inspection process for the received article 12. The receiving system 83 stores the article 12 subjected to the receiving process and the inspection process into an article container and passes the article container to the automatic warehouse 81 for storage. In this case, the article container contains one or more articles 12 of the same kind.

The receiving system 83 includes an inspection robot 91, an inspection terminal device 92, an inspection conveyance device 94, an inbound robot 95, an inbound terminal device 96, and an inbound conveyance device 98. The receiving system 83 operates in cooperation with an inspection operator 93 and an inbound operator 97.

The inspection robot 91 is an example of the robot 21. The inspection robot 91 assists the receiving process and the inspection process for the article 12 on arrival, in accordance with an instruction from the management system 30.

The inspection terminal device 92 is an example of the terminal device 22. The inspection terminal device 92 is held by the inspection operator 93. The inspection terminal device 92 displays an instruction from the management system 30 to the inspection operator 93. The inspection operator 93 performs the receiving process and the inspection process for the article 12 on arrival in cooperation with the inspection robot 91, in accordance with the instruction displayed on the inspection terminal device 92. The inspection robot 91 and the inspection operator 93 put the article 12 for which the receiving process and the inspection process have been completed, into an arrival container. The inspection conveyance device 94 transports the arrival container containing the article 12 subjected to the receiving process and the inspection process to the work space for the inbound robot 95 or the inbound operator 97.

The inbound robot 95 receives the article 12 contained in the arrival container and puts the received article 12 into an article container. The inbound terminal device 96 is an example of the terminal device 22. The inbound terminal device 96 is held by the inbound operator 97. The inbound terminal device 96 displays an instruction from the management system 30 to the inbound operator 97. The inbound operator 97 puts the article 12 contained in the arrival container into an article container, in accordance with the instruction displayed on the inbound terminal device 96.

The inbound conveyance device 98 transports the article container containing the article 12 to the automatic warehouse 81. The automatic warehouse 81 Then receives the article container from the inbound conveyance device 98 and stores the received article container in the inside.

The management system 30 controls the operation of the automatic warehouse 81, the shipping system 82, and the receiving system 83.

Figure 18:
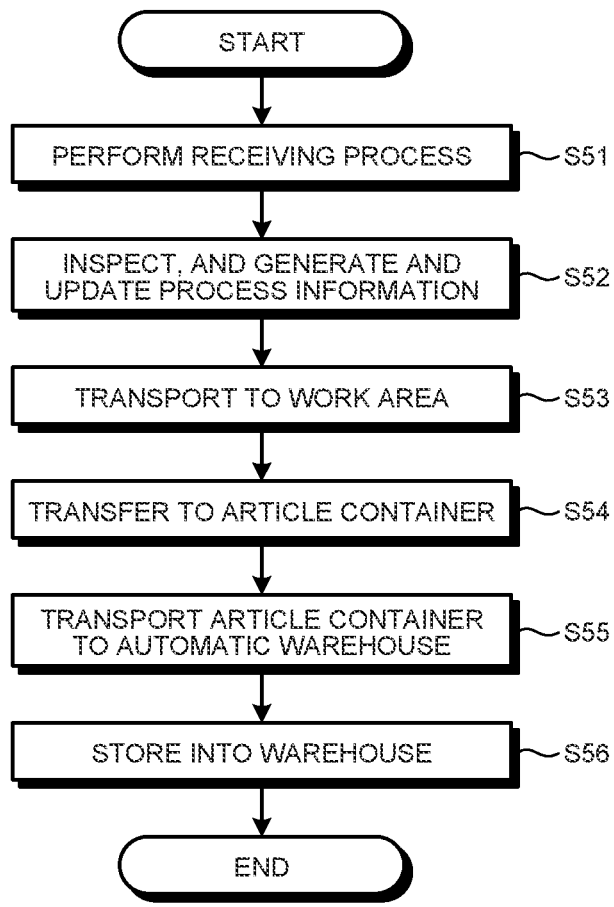
FIG. 18 is a diagram illustrating a receiving process in the receiving and shipping system.

FIG. 18 is a diagram illustrating the receiving process in the receiving and shipping system 80. The receiving and shipping system 80 performs the process according to the flow illustrated in FIG. 18 when a new article 12 arrives.

First of all, at S51, the inspection operator 93 receives an article 12 contained in an arrival container and performs the receiving process. For example, the inspection operator 93 checks, for example, whether the article 12 on arrival matches an arrival invoice and whether the article 12 on arrival includes any defective. The inspection operator 93 then inputs information about the article 12 on arrival to the inspection terminal device 92. For example, the inspection operator 93 inputs the article ID and supplemental information such as the number of articles 12 on arrival to the inspection terminal device 92. The management system 30 then receives and registers the article ID and supplemental information for the article 12 on arrival from the inspection terminal device 92. The management system 30 thus can perform appropriate inventory management and shipment management.

Subsequently, at S52, the inspection operator 93 executes the inspection process. In the inspection process, the inspection operator 93 checks whether the shipment robot 87 is able to handle the article 12 on arrival. In the inspection process, when the shipment robot 87 is able to handle the article 12 on arrival, the inspection operator 93 checks which shipment robot 87 of a plurality of shipment robots 87 is appropriate for handling.

The inspection operator 93 then inputs the handling method and the robot list for the article 12 to the inspection terminal device 92. For example, if the shipment robot 87 is unable to handle, the inspection operator 93 inputs the shipment operator 89 as the handling method. For example, when the shipment robot 87 is able to handle, the inspection operator 93 inputs shipment robot 87 as the handling method and inputs the kind of shipment robot 87 capable or handling in the robot list. The management system 30 then receives the handling method and the robot list for the article 12 on arrival from the inspection terminal device 92 and registers the same in the process information for the article 12 on arrival. The management system 30 thus can use an appropriate handling method to ship the article 12.

Here, the inspection operator 93 executes the inspection process using the inspection robot 91. For example, the inspection robot 91 is the same as the shipment robot 87. The inspection operator 93 allows the inspection robot 91 to handle the article 12 on arrival to check whether the shipment robot 87 is able to handle the article 12 on arrival. The inspection robot 91 may have only a part of the shipment robot 87. For example, the inspection robot 91 may have only the manipulator 412 of the shipment robot 87, may have only the end effector, or may have only an image capturing stage and an image capturing sensor. In this way, for example, at the time of inspection of inbound articles, the process information is updated so that all of the articles stored in the warehouse can be provided with accurate process information, and the shipping process can be performed efficiently.

When the same or similar article 12 arrived in stock in the past, the inspection operator 93 may input process information based on the result of the past inspection process for the same or similar article 12. The inspection operator 93 may execute the inspection process using the inspection robot 91 and, in addition, detect and input the outer shape information and the article weight of the article 12 on arrival to the inspection terminal device 92. In this case, the management system 30 receives the outer shape information and the article weight for the article 12 on arrival from the inspection terminal device 92 and registers them in the article information for the article 12 on arrival.

Subsequently, at S53, the inspection conveyance device 94 transports the article 12 contained in the arrival container to the work space for the inbound robot 95 or the inbound operator 97. When the handling method input in the inspection process is shipment robot 87, the inspection conveyance device 94 transports the article 12 on arrival to the work space for the inbound robot 95. When the handling method input in the inspection process is the shipment operator 89, the inspection conveyance device 94 transports the article 12 on arrival to the work space for the inbound operator 97.

Subsequently, at S54, the inbound robot 95 or the inbound operator 97 receives the arrival container containing the article 12 and transfers the article 12 into an article container. That is, the inbound robot 95 or the inbound operator 97 removes the article 12 contained in the arrival container and puts the removed article 12 into an article container. After the article 12 is put into an article container, the inbound robot 95 transmits the process content and the process result to the management system 30. After the article 12 is out into an article container, the inbound operator 97 inputs the process content and the process result to the inbound terminal device 96. The management system 30 receives the process content and the process result from The inbound robot 95 or the inbound terminal device 96 and updates, for example, information associating the ID of the article container with the article ID, and the number of articles 12 contained in the article container.

Subsequently, at S55, the inbound conveyance device 98 transports the article container containing the article 12 to the automatic warehouse 81. Then, at S56, the automatic warehouse 81 receives the article container from the inbound conveyance device 98 and stores the received article container in the inside. When the process at S56 is finished, the receiving and shipping system 80 terminates the flow.

Figure 19:
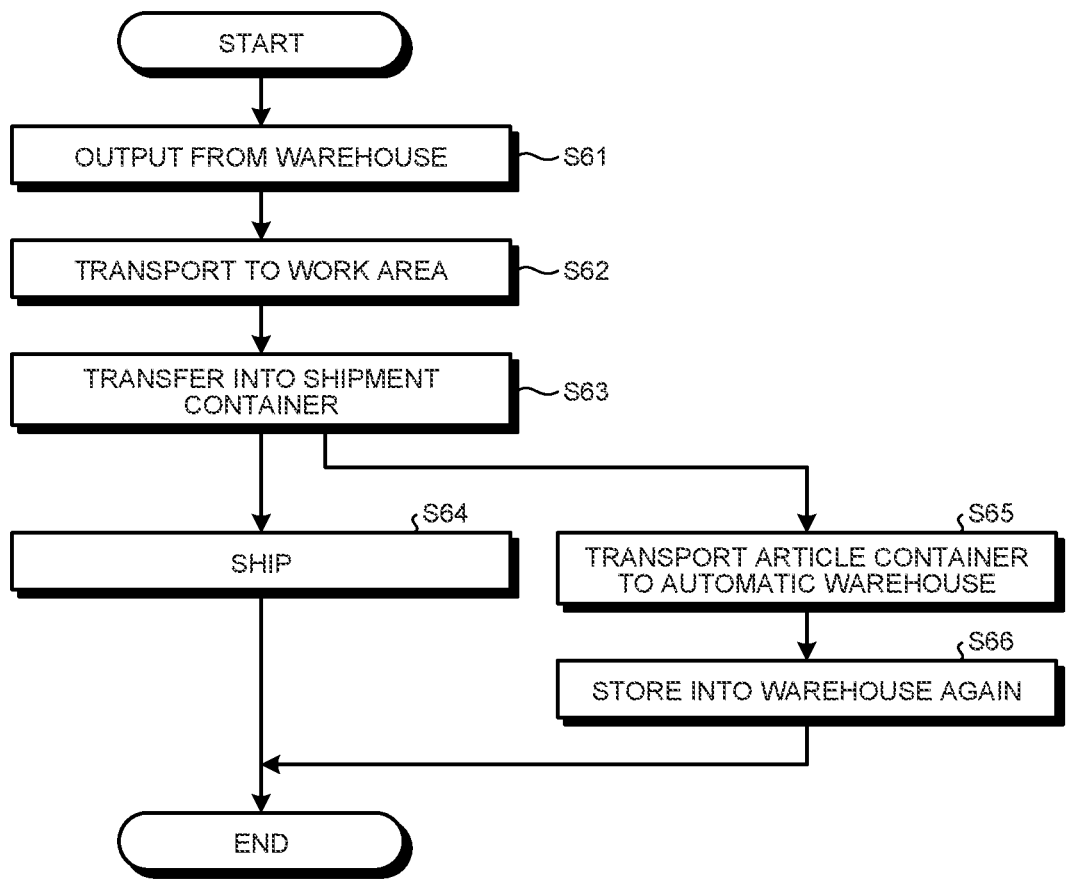
FIG. 19 is a diagram illustrating a shipping process in the receiving and shipping system.

FIG. 19 is a diagram illustrating the shipping process in the receiving and shipping system 80. When a shipment instruction is received from the high-level system 34, the receiving and shipping system 80 executes the process according to the flow illustrated in FIG. 19.

First of all, at S61, the automatic warehouse 81 outputs an article container containing the target article 14. When receiving a shipment instruction to ship the target articles 14 of different kinds, the automatic warehouse 81 outputs an article container for each individual target article 14.

Subsequently, at S62, the conveyance system 20 transports the article container output from the automatic warehouse 81 to the work space for the shipment robot 87 or the shipment operator 89. In this case, the conveyance system 20 transports the article container, in the same manner as in the article processing system 50 illustrated in FIG. 9.

Subsequently, at S63, the shipment robot 87 or the shipment operator 89 transfers the target articles 14 corresponding to the number of shipments from the article container to a pickup container. That is, the shipment robot 87 or the shipment operator 89 removes the target articles 14 corresponding to the number of shipments from the article container and puts the removed target articles 14 into a pickup container.

After putting the target articles 14 into a pickup container, the shipment robot 87 transmits the process content and the process result to the management system 30, in the same manner as the robot 21 of the article processing system 50 illustrated in FIG. 9. After putting the target articles 14 into an article container, the shipment operator 89 inputs the process content and the process result to the shipment terminal device 88, in the same manner as the operator 23 of the article processing system 50 illustrated in FIG. 9. The management system 30 receives the process content and the process result from the shipment robot 87 or the shipment terminal device 88 and updates the process information, in the same manner as in the article processing system 50 illustrated in FIG. 9.

At S63, if the shipment robot 87 has failed to remove the target article 14, the conveyance system 20 transports the article container containing the target article 14 that the shipment robot 87 has failed to remove, to the workspace for the shipment operator 89, in the same manner as in the article processing system 50 illustrated in FIG. 9. The shipment operator 89 then transfers the target article 14 that the shipment robot 87 has failed to remove, from the article container to a pickup container.

Subsequently, at S64, in the conveyance system 20, the fourth conveyance device 86 transports and outputs the pickup container containing the target article 14 to a shipment area. Concurrently with S64, at S65, the conveyance system 20 transports the article container to the automatic warehouse 61 after the target article 14 is removed. Then, at S66 after S65, the automatic warehouse 81 receives the article container and stores it in the inside again. When the processes at S64 and S66 are finished, the receiving and shipping system 80 terminates the flow.

The fourth conveyance device 86 included in the conveyance system 20 transports a pickup container to the work space for the shipment robot 87 or the shipment operator 89, in synchronization with the timing when the article container is transported to the work space for the shipment robot 87 or the shipment operator 89. The shipment robot 87 and the shipment operator 89 thus can put the target article 14 into an appropriate shipment container.

When a shipment instruction to ship different kinds of target articles 14 is received, the management system 30 allows the fourth conveyance device 86 to successively transport a pickup container to the workspace of each of a plurality of shipment robots 87 and each of a plurality of shipment operators 89. The receiving and shipping system 80 thus can allow different kinds of target articles 14 to be contained in one pickup container.

When a shipment instruction to ship different kinds of target articles 14 is received, the management system 30 may successively transport a plurality of article containers to the shipment robot 87 or the shipment operator 89 in a state in which a pickup container is stopped at the work space for the shipment robot 87 or the shipment operator 89. The receiving and shipping system 80 thus can allow different kinds of target articles 14 to be contained in one pickup container.

As described above, in the receiving and shipping system 80, the shipment robot 87 or the shipment operator 89 performs the process of removing the target article 14 contained in an article container and putting the removed target article 14 into a pickup container. With this process, the receiving and shipping system 80 can allow the shipment robot 87 and the shipment operator 89 to cooperate with each other efficiently while reducing the burden of determination and processing by the shipment robot 87 and the shipment operator 89.

First Example of Shipping System 82

Figure 20:
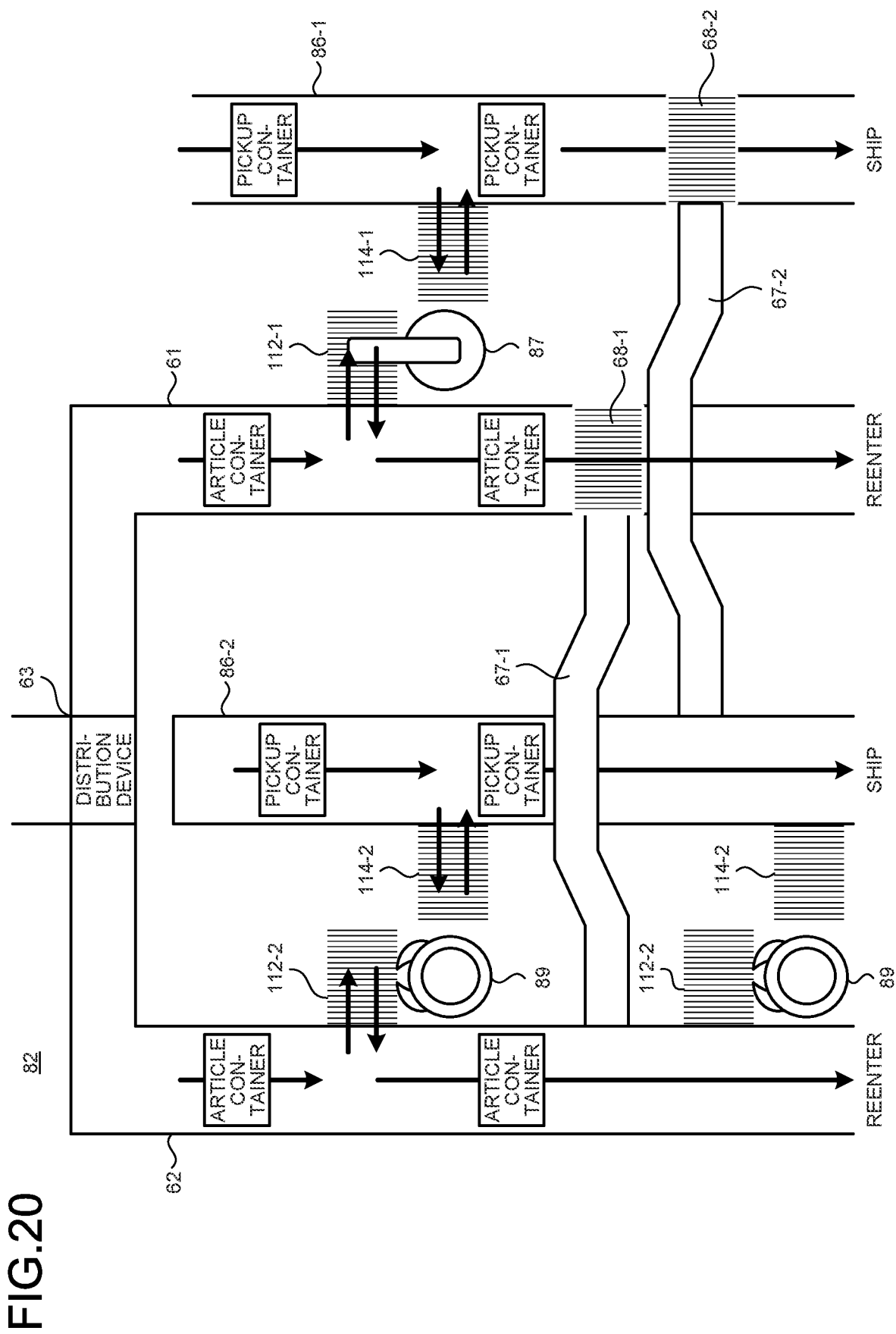
FIG. 20 is a diagram illustrating a shipping system according to a first example.

The shipping system 82 included in the receiving and shipping system 80 illustrated in FIG. 17 may be a configuration of a first example as illustrated in FIG. 20.

FIG. 20 is a diagram illustrating the shipping system 82 according to the firs example. The shipping system 82 according to the first example includes, as the fourth conveyance device 86, a fourth conveyance device 86-1 for robots and a fourth conveyance device 86-2 for operators.

The fourth conveyance device 86-1 for robots is provided such that its conveyance path is near and parallel to the conveyance path of the first conveyance device 61. The shipment robot 87 is arranged between the first conveyance device 61 and the fourth conveyance device 86-1 for robots.

The fourth conveyance device 86-2 for operators is provided such that its conveyance path is near and parallel to the conveyance path of the second conveyance device 62. The shipment operator 89 is arranged between the second conveyance device 62 and the fourth conveyance device 86-2 for operators.

In the first example, the first conveyance device 61 has an article container pull-in section 112-1 for robots. The article container pull-in section 112-1 for robots pulls an article container from the main conveyance path into the work space for the shipment robot 87 and further returns an article container from the work space to the main conveyance path. The article container pull-in section 112-1 for robots can temporarily stay an article container in the work space for the shipment robot 87.

The second conveyance device 62 has an article container pull-in section 112-2 for operators. The article container pull-in section 112-2 for operators pulls an article container from the main conveyance path into the work space for the shipment operator 89 and further returns an article container from the work space to the main conveyance path. The article container pull-in section 112-2 for operators can temporarily stay an article container in the work space for the shipment operator 89.

The fourth conveyance device 86-1 for robots has a pickup container pull-in section 114-1 for robots. The pickup container pull-in section 114-1 for robots pulls a pickup container from the main conveyance path into the workspace for the shipment robot 87 and further returns a pickup container from the work space to the main conveyance path. The pickup container pull-in section 114-1 for robots can temporarily stay a pickup container in the work space for the shipment robot 87.

The fourth conveyance device 86-2 for operators has a pickup container pull-in section 114-2 for operators. The pickup container pull-in section 114-2 for operators pulls a pickup container from the main conveyance path into the work space for the shipment operator 89 and further returns a pickup container from the work space to the main conveyance path. The pickup container pull-in section 114-2 for operators can temporarily stay a pickup container in the work space for the shipment operator 89.

In this way, the first conveyance device 61 and the second conveyance device 62 each have an article container pull-in section 112 and therefore can prevent article containers from staying on the main conveyance path. The fourth conveyance device 86 has the pickup container pull-in section 114 and therefore can prevent pickup containers from staying on the main conveyance path. With this configuration, the shipment robot 87 and the shipment operator 89 can transfer the target article 14 from an article container to a pickup container reliably.

The management system 30 manages the transfer positions on a conveyance path of an article container and a pickup container. The management system 30 manages the ID of an article container containing the target article 14 and the ID of a pickup container containing the target article 14 in association with each other. The management system 30 then controls, for example, the input timings of the article container and the pickup container such that the associated article container and pickup container reach the work space for the shipment robot 87 or the shipment operator 89 at the same timing.

The shipment robot 87 and the shipment operator 89 receive, from the management system 30, an operation instruction including a set of the ID of an article container and the ID of a pickup container and the number of target articles 14 to be transferred. The shipment robot 87 and the shipment operator 89 then check the ID of the article container and the ID of the pickup container staying at their own work spaces, remove the specified number of target articles 14 from the article container with the specified ID, and put the removed target articles 14 into the pickup container with the specified ID. The shipping system 82 thus can perform the shipping process accurately.

When different kinds of target articles 14 are contained in one pickup container, the management system 30 successively sends a plurality of different article containers in a state in which one pickup container stays in the work space for the shipment robot 87 or the shipment operator 89. The shipment robot 87 or the shipment operator 69 removes the target article 14 from each of the article containers successively received and puts the removed target article 14 into the pickup container staying in its own work space. The shipping system 82 thus can send different kinds of target articles 14 simultaneously to one shipment destination.

When different kinds of target articles 14 are contained in one pickup container, the management system 30 may transport a pickup container successively to a plurality of shipment robots 87 or a plurality of shipment operators 89, Each of the shipment robots 87 or the shipment operators 89 therefore can put the target article 14 in the same pickup container. Even in this manner, the shipping system 82 can send different kinds of target articles 14 simultaneously to one shipment destination.

Figure 21:
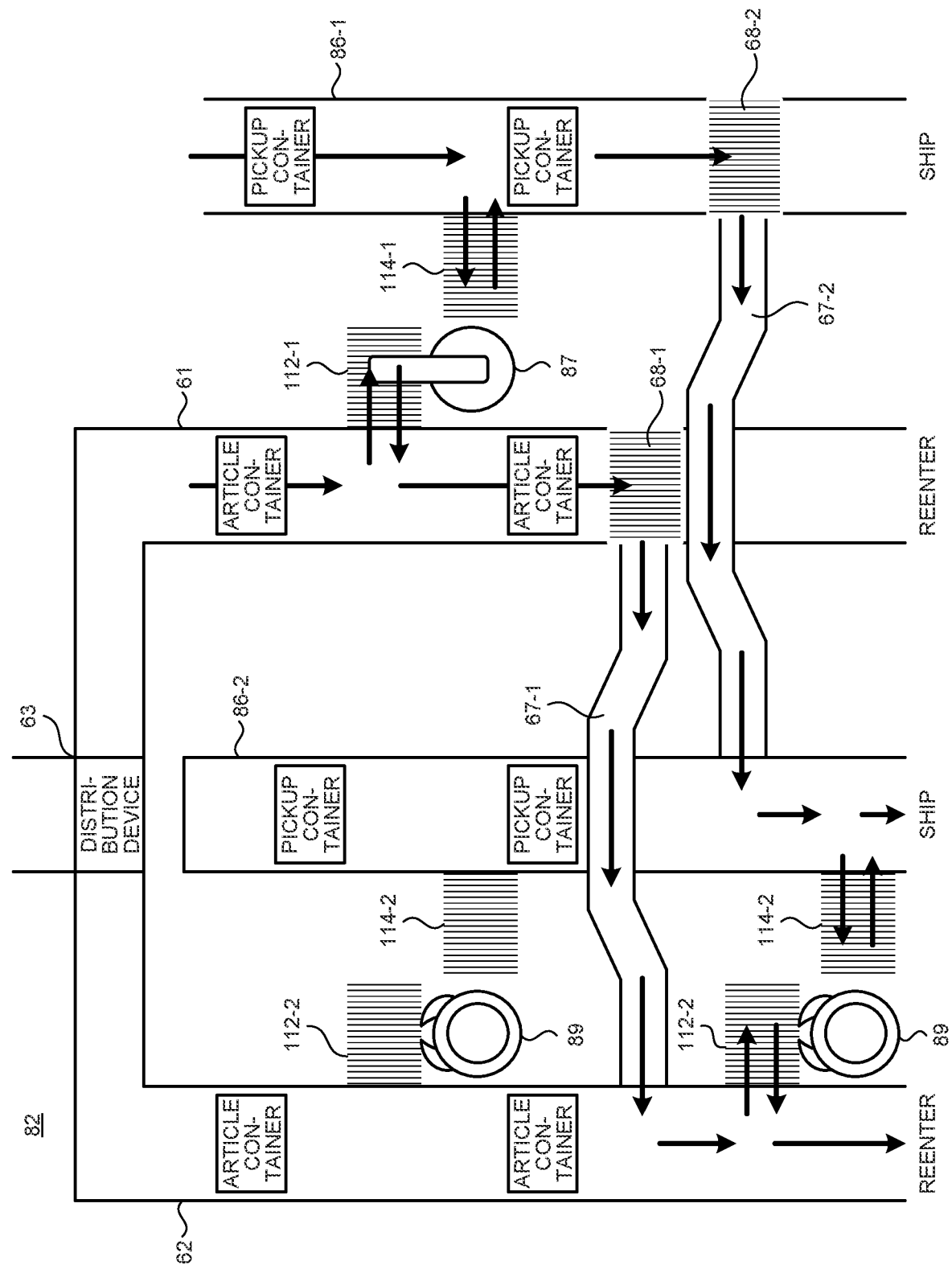
FIG. 21 is a diagram illustrating a flow of containers at the time of a failure in the shipping system according to the first example.

FIG. 21 is a diagram illustrating a flow of containers at the time of a failure in the shipping system 82 according to the first example.

The shipping system 82 according to the first example includes, as the third conveyance device 67, a third conveyance device 67-1 for article containers and a third conveyance device 67-2 for pickup containers. The shipping system 82 according to the first example also includes, as the direction change device 68, a direction change device 68-1 for article containers and a direction change device 68-2 for pickup containers.

The third conveyance device 67-1 for article containers sends an article container transported by the first conveyance device 61 to the second conveyance device 62. The direction change device 68-1 for article containers is provided in the middle or at the final stage of the conveyance path of the first conveyance device 61. When the shipment robot 87 has failed in a process for the target article 14, the direction change device 68-1 for article containers sends an article container containing the target article 14 to the third conveyance device 67-1 for article containers.

The third conveyance device 67-2 for pickup containers sends a pickup container transported by the fourth conveyance device 86-1 for robots to the fourth conveyance device 86-2 for operators. The direction change device 68-2 for pickup containers is provided in the middle or at the final stage of the conveyance path of the fourth conveyance device 86-1 for robots. When the shipment robot 87 has failed in a process for the target article 14, the direction change device 68-2 for pickup containers sends a pickup container to be loaded with the target article 14 to the third conveyance device 67-2 for pickup containers.

When the process by the shipment robot 87 is not completed normally or causes an error, the management system 30 controls the direction change device 68-1 for article containers to send a target article container to the second conveyance device 62. In addition, the management system 30 controls the direction change device 68-2 for pickup containers to send a target pickup container to the fourth conveyance device 86-2 for operators. With this control, even when the process by the shipment robot 87 is failed, the management system 30 can send the article container and the pickup container associated with each other to the work space for the shipment operator 89 at the same timing.

When the shipment robot 87 makes a mistake of putting target articles 14 more than the specified number into a pickup container, the shipment robot 87 gives a notice to the management system 30. When such a mistake occurs, the management system 30 gives an instruction to the shipment operator 89 to remove the specified number of target articles 14 from the pickup container and returns the removed target articles 14 to the article container. In response to the instruction from the management system 30, the shipment operator 89 removes the specified number of target articles 14 from the pickup container transferred from the shipment robot 87 and returns the removed target articles 14 into the article container transferred from the shipment robot 87. The shipment operator 89 thus can perform recovery operation when the shipment robot 87 puts target articles 14 more than the specified number into a pickup container.

Second Example of Shipping System 82

Figure 22:
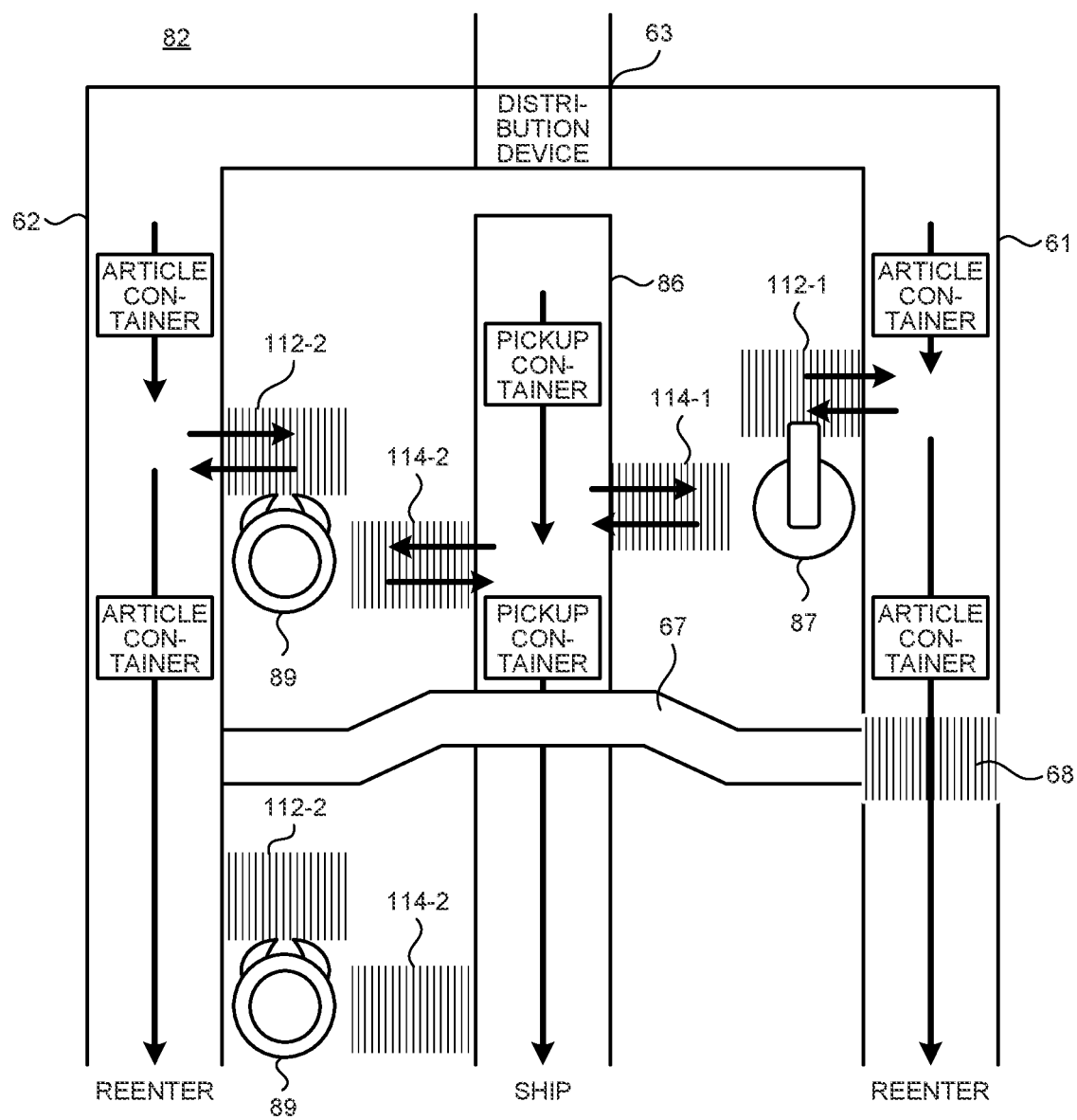
FIG. 22 is a diagram illustrating the shipping system according to a second example.

FIG. 22 is a diagram illustrating the shipping system 82 according to a second example. The shipping system 82 included in the receiving and shipping system 80 illustrated in FIG. 17 may be a configuration of the second example as illustrated in FIG. 22.

In the second example, the first conveyance device 61, the second conveyance device 62, and the fourth conveyance device 86 are provided such that their conveyance paths are parallel to each other. In the second example, the fourth conveyance device 86 is provided between the first conveyance device 61 and the second conveyance device 62.

In the second example, the shipment robot 87 is arranged between the first conveyance device 61 and the fourth conveyance device 86. In the second example, the shipment operator 89 is arranged between the second conveyance device 62 and the fourth conveyance device 86.

In the second example, the first conveyance device 61 has an article container pull-in section 112-1 for robots. In the second example, the second conveyance device 62 has an article container pull-in section 112-2 for operators. In the second example, the fourth conveyance device 86 has a pickup container pull-in section 114-1 for robots and a pickup container pull-in section 114-2 for operators.

The fourth conveyance device 86 according to the second example sends a pickup container to both of the shipment robot 87 and the shipment operator 89. The management system 30 therefore can send the pickup container to the shipment robot 87 and thereafter send the pickup container to the work space for the shipment operator 89. With this configuration, the shipping system 82 according to the second example can put different kinds of target articles 14 into one pickup container, by both of the shipment robot 87 and the shipment operator 89.

Figure 23:
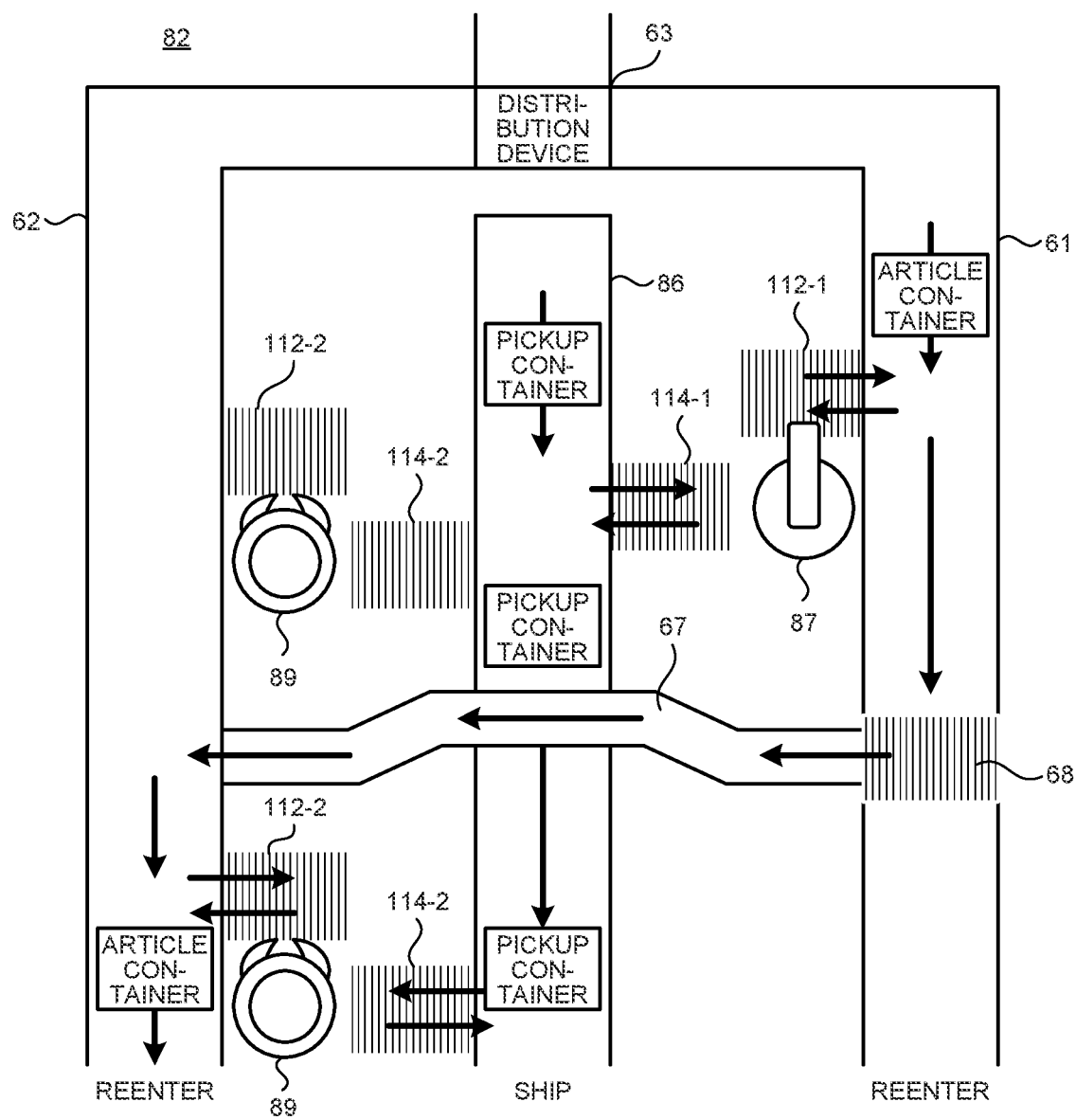
FIG. 23 is a diagram illustrating a flow of containers at the time of a failure in the shipping system according to the second example.

FIG. 23 is a diagram illustrating a flow of containers at the time of a failure in the shipping system 82 according to the second example. For example, when a plurality of target articles 14 contained in one article container vary and the shipment robot 87 is unable to continue operation normally, the shipment robot 87 stops the process and transmits information to the management system 30 to indicate that the process has been stopped. When receiving the information indicating that the process has been stopped, the management system 30 revises a plan of the subsequent process and controls the whole based on the revised plan.

For example, the management system 30 returns the article container with variation of the contained target articles 14 to the first conveyance device 61 and transfers the article container to the work space for the shipment operator 89 located downstream from the third conveyance device 67 for a recovery operation, via the third conveyance device 67. Furthermore, the management system 30 allows the fourth conveyance device 86 to transfer a corresponding pickup container to the work space for the shipment operator 89 for performing a recovery operation. The management system 30 then gives an instruction to the shipment operator 89 for performing a recovery operation to perform the process not completed normally by the shipment robot 87. The shipping system 82 according to the second example thus can allow the shipment operator 89 to perform recovery even when the shipment robot 87 is unable to continue operation normally and suspends the process.

Third Example of Shipping System 82

Figure 24:
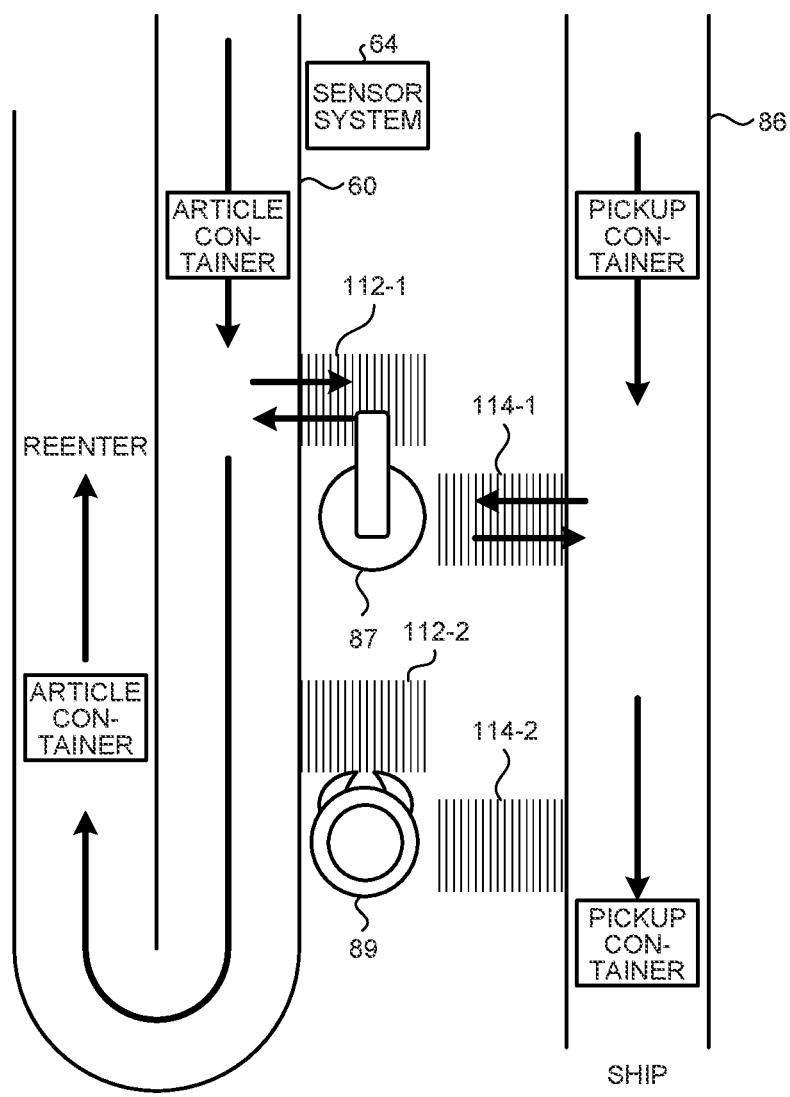
FIG. 24 is a diagram illustrating the shipping system according to a third example.

FIG. 24 is a diagram illustrating the shipping system 82 according to a third example. The shipping system 82 included in the receiving and shipping system 80 illustrated in FIG. 17 may be a configuration of the third example as illustrated in FIG. 24.

In the third example, the fourth conveyance device 86 is provided such that its conveyance path is near and parallel to the conveyance path of the common conveyance device 60. In the third example, the shipment robot 87 and the shipment operator 89 are arranged in a space between the common conveyance device 60 and the fourth conveyance device 86.

The shipment operator 89 is arranged downstream from the shipment robot 87 in the conveyance path of the common conveyance device 60 and the fourth conveyance device 86.

The shipping system 82 according to the third example may have a plurality of shipment robots 87 and a plurality of shipment operators 89. In this case, a plurality of shipment robots 87 and a plurality of shipment operators 89 are arranged to be aligned in a row along the conveyance path of the common conveyance device 60 and the fourth conveyance device 86.

The common conveyance device 60 has an article container pull-in section 112-1 for robots and an article container pull-in section 112-2 for operators. The article container pull-in section 112-1 for robots pulls an article container from the main conveyance path of the common conveyance device 60 into the work space for the shipment robot 87 and returns an article container from the work space to the main conveyance path. The article container pull-in section 112-2 for operators pulls an article container from the main conveyance path of the common conveyance device 60 into the work space for the shipment operator 89 and further returns an article container from the work space to the main conveyance path.

That is, in the third example, the article container pull-in section 112-1 for robots functions as the first conveyance device 61. In the third example, the article container pull-in section 112-2 for operators functions as the second conveyance device 62.

In the third example, the sensor system 64 is arranged upstream from the work spaces of the shipment robot 87 and the shipment operator 89. The management system 30 determines whether the shipment robot 87 is able to handle and process the target article 14 contained in an article container, based on information acquired from the sensor system 64, in the same manner as in the article processing system 50 illustrated in FIG. 9.

When the shipment robot 87 is able to handle and process the target article 14, the management system 30 allows the article container pull-in section 112-1 for robots (functioning as the first conveyance device 61) to pull the article container into the work space for the shipment robot 87. In addition, the management system 30 allows the pickup container pull-in section 114-1 for robots to pull a pickup container associated with the article container into the work space for the shipment robot 87. The shipment robot 87 then can remove the target article 14 contained in the article container and put the removed target article 14 into the pickup container.

Figure 25:
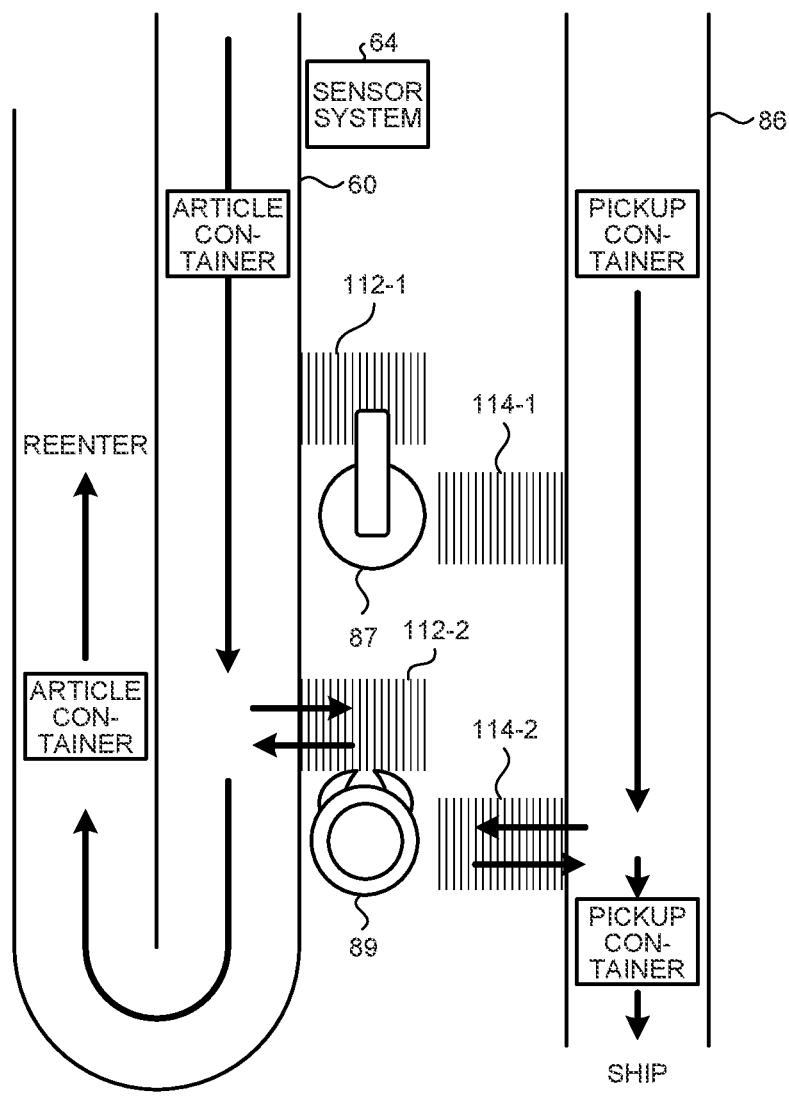
FIG. 25 is a diagram illustrating a flow of containers when a shipment operator performs a process according to the third example.

FIG. 25 is a diagram illustrating a flow of the article container and the pickup container when the shipment operator 89 in the shipping system 82 according to the third example performs a process.

When the shipment robot 87 is unable to handle and process the target article 14, the management system 30 allows the article container pull-in section 112-2 for operators (functioning as the second conveyance device 62) to pull the article container into the work space for the shipment operator 89. In addition, the management system 30 allows the pickup container pull-in section 114-2 for operators to pull a pickup container associated with the article container into the work space for the shipment operator 89. The shipment operator 89 thus can remove the target article 14 contained in the article container and puts the removed target article 14 into the pickup container.

Figure 26:
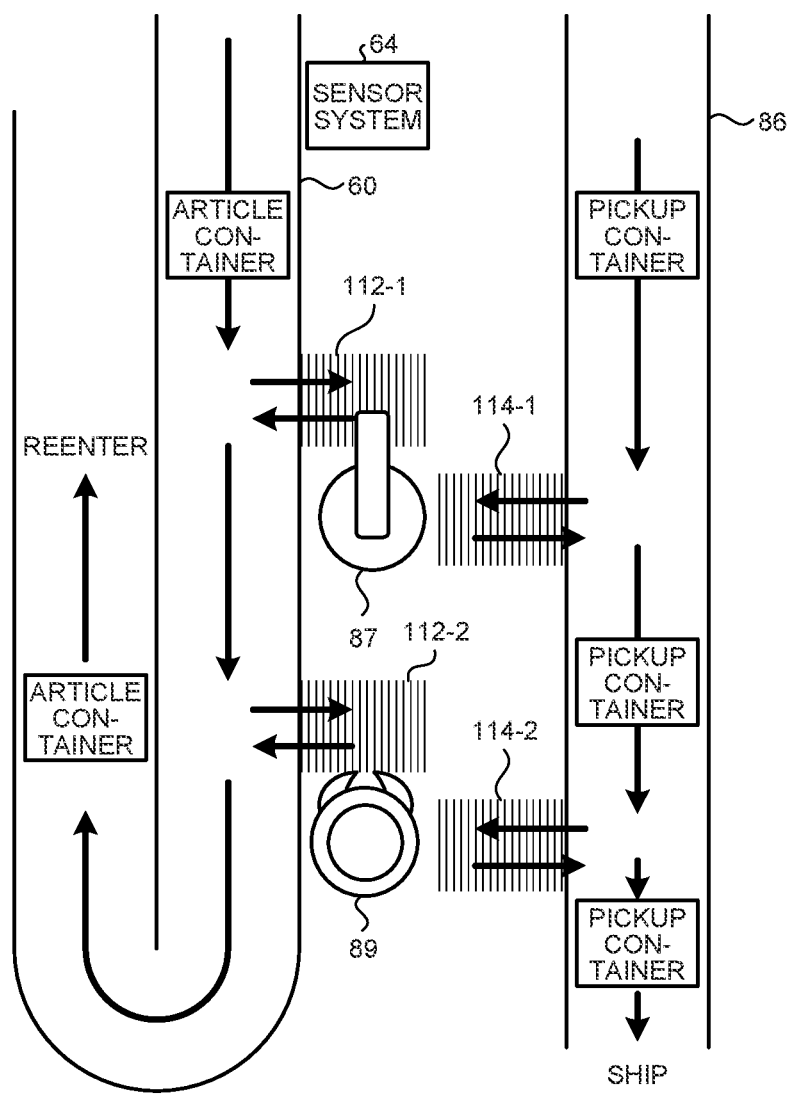
FIG. 26 is a diagram illustrating a flow of containers at the time of a failure in the shipping system according to the third example.

FIG. 26 is a diagram illustrating a flow of containers at the time of a failure in the shipping system 82 according to the third example.

When the process by the shipment robot 87 is not completed normally or causes an error, the management system 30 controls the article container pull-in section 112-1 for robots such that a target article container is returned to the main conveyance path of the common conveyance device 60. In addition, the management system 30 controls the pickup container pull-in section 114-1 for robots such that a corresponding pickup container is returned to the main conveyance path of the fourth conveyance device 86.

Subsequently, the management system 30 transports the article container to the downstream side of the common conveyance device 60. In synchronization with this, the management system 30 transports the corresponding pickup container to the downstream side of the fourth conveyance device 86.

The management system 30 then allows the article container pull-in section 112-2 for operators to pull the article container into the work space for the shipment operator 89. The management system 30 also allows the pickup container pull-in section 114-2 for operators to pull the corresponding pickup container into the work space for the shipment operator 89.

The management system 30 then gives an instruction to the shipment operator 89 to execute the process not completed normally by the shipment robot 87. The shipping system 82 according to the third example thus can allow the shipment operator 89 to perform recovery even when the shipment robot 87 fails in a process.

Modification of Conveyance System 20

Figure 27:
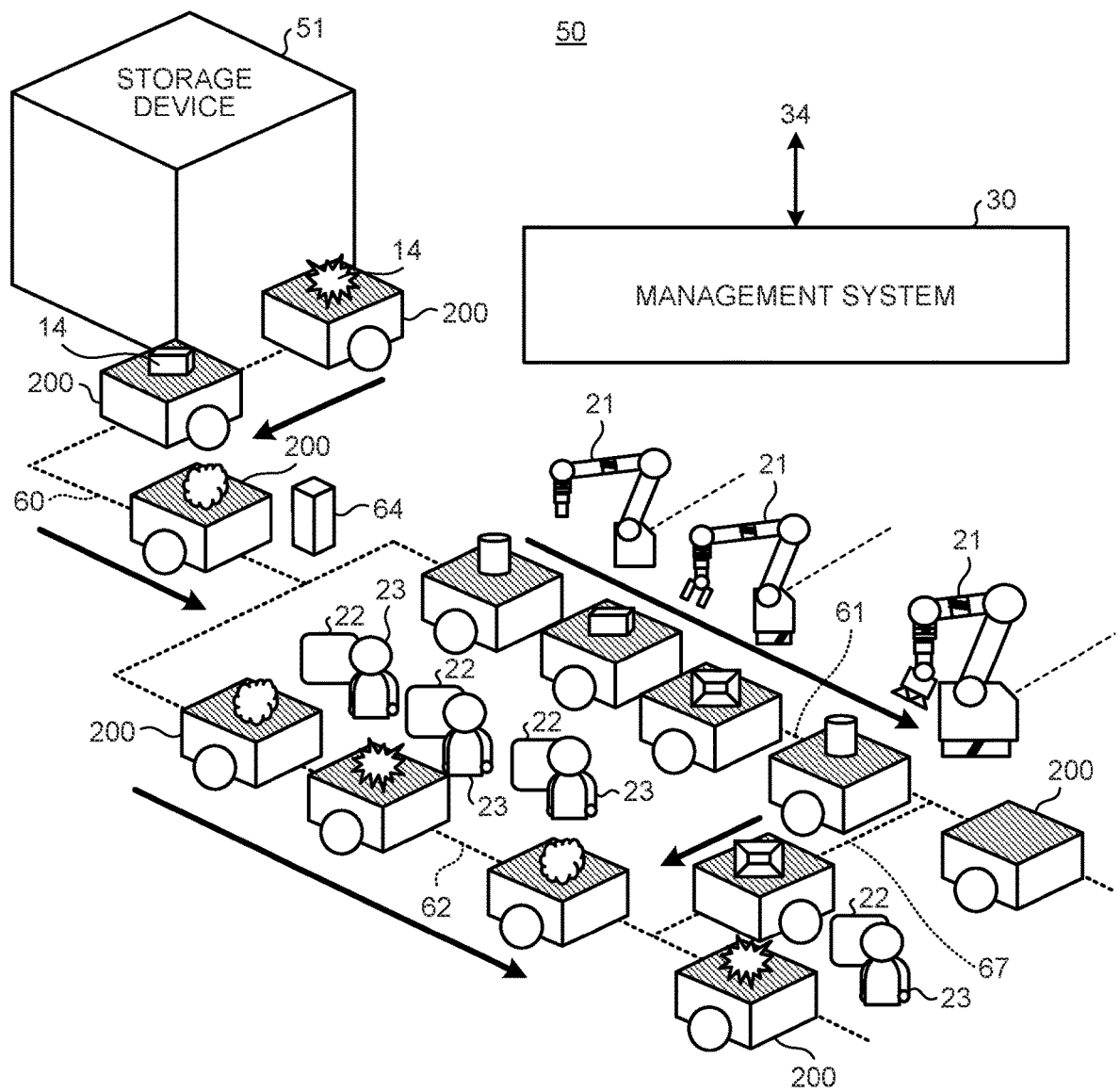
FIG. 27 is a diagram illustrating the article processing system using movable robots.

FIG. 27 is a diagram illustrating the article processing system 50 using movable robots 200. At least one of the common conveyance device 60, the first conveyance device 61, the second conveyance device 62, and the third conveyance device 67 included in the conveyance system 20 may partially include a movable robot 200 transporting the target article 14. Furthermore, the movable robot 200 also functions as a distribution device 63 under an instruction from the management system 30.

The movable robot 200 can move while holding the target article 14 or an article container containing the target article 14. The management system 30 controls the respective transfer positions of a plurality of movable robots 200 to transfer the target article 14, in the same manner as in the article processing system 50 illustrated in FIG. 9. That is, the article processing system 50 illustrated in FIG. 27 can function in the same manner as the article processing system 50 illustrated in FIG. 9. Since the article processing system 50 allows the movable robot 200 to distribute and transport the target article 14 in this way, there is no need for laying a new conveyor or the like, for example, even when the number of robots 21 and the number of operators 23 are changed, or when the robots 21 and the operators 23 are relocated. In the article processing system 50 allowing the movable robot 200 to transport the target article 14, the layout can easily be changed only by updating, for example, a control program for the management system 30.

While certain embodiments have been described, these embodiments have been presented by wary of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handling system that handles and processes plural kinds of articles, the handling system comprising:
a first conveyance device configured to transport a target article to be processed among the plural kinds of articles to a work area for a robot to handle and process the target article;
a second conveyance device configured to transport the target article to a work area for a first operator to handle and process the target article;
a third conveyance device connected to a first portion of the first conveyance device and a second portion of the second conveyance device, wherein the first portion of the first conveyance device is between end points of the first conveyance device and the second portion of the second conveyance device is between end points of the second conveyance device,
wherein the third conveyance device is configured to, when the robot is unable to process the target article transported by the first conveyance device, receive the target article, which cannot be processed, from the first conveyance device and transport the received target article to the second conveyance device; and
a control device configured to:
determine by which of the robot or the first operator the target article is to be processed, in accordance with process information generated based on a result of handling and processing of an article by the robot in past, and
transport the target article to the first conveyance device when the control device determines that the target article is to be processed by the robot, and transport the target article to the second conveyance device when the control device determines that the target article is to be processed by the first operator.

2. The handling system according to claim 1, further comprising:
a common conveyance device configured to transport the target article; and
a distribution device configured to transport the target article transported by the common conveyance device to the first conveyance device or the second conveyance device.

3. The handling system according to claim 1, wherein the control device updates the process information, based on a result of handling and processing of the target article transported by the first conveyance device by the robot in past.

4. The handling system according to claim 1, wherein
the robot is operable in a normal operation mode of handling and processing the target article and a stable operation mode of handling and processing the target article more reliably than in the normal operation mode, and
the control device controls the robot to operate in the stable operation mode when the target article is to be processed by the robot and reliability of estimation as to whether the target article is to be handled by the robot or handled by the operator is a given value or lower.

5. The handling system according to claim 1, wherein
in a warehouse for storing the plural kinds of articles, an article is received in an inbound process, and the target article is output in an outbound process, and
in the inbound process, the process information is generated.

6. The handling system according to claim 1, wherein the first conveyance device and the second conveyance device are conveyors.

7. The handling system according to claim 1, wherein at least one of the first conveyance device and the second conveyance device includes a movable robot configured to transport the target article.

8. The handling system according to claim 1, further comprising:
a terminal device configured to receive an input of a result of inspection on the target article performed by a second operator; and
an inspection robot configured to be operated by the second operator, wherein
the robot has a normal operation mode and a stable operation mode.

9. A control method executed by a computer and in a handling system that handles plural kinds of articles, the method comprising:
transporting, by a first conveyance device, a target article to be processed among the plural kinds of articles to a work area for a robot to handle and process the target article;
transporting, by a second conveyance device, the target article to a work area for a first operator to handle and process the target article;
when the robot is unable to process the target article transported by the first conveyance device, receiving, by a third conveyance device, the target article, which cannot be processed, from the first conveyance device, and
transporting, by the third conveyance device, the received target article to the second conveyance device,
wherein the third conveyance device is connected to a first portion of the first conveyance device and a second portion of the second conveyance device, and
the first portion of the first conveyance device is between end points of the first conveyance device and the second portion of the second conveyance device is between end points of the second conveyance device;
controlling by:
determining by which of the robot or the first operator the target article is to be processed, in accordance with process information generated based on a result of handling and processing of an article by the robot in past; and
transporting the target article to the first conveyance device when it is determined that the target article is to be processed by the robot, and
transporting the target article to the second conveyance device when it is determined that the target article is to be processed by the first operator;
receiving an input of a result of inspection on the target article performed by a second operator; and
inspecting the target article by an inspection robot configured to be operated by the second operator,
wherein the robot has a normal operation mode and a stable operation mode.

10. A handling system that handles and processes plural kinds of articles, the handling system comprising:
a first conveyance device configured to transport a target article to be processed among the plural kinds of articles to a work area for a robot to handle and process the target article;
a second conveyance device configured to transport the target article to a work area for an operator to handle and process the target article;
a third conveyance connected to a first portion of the first conveyance device and a second portion of the second conveyance device, wherein the first portion of the first conveyance device is between end points of the first conveyance device and the second portion of the second conveyance device is between end points of the second conveyance device,
wherein the third conveyance device is configured to, when the robot is unable to process the target article transported by the first conveyance device, receive the target article, which cannot be processed, from the first conveyance device and transport the received target article to the second conveyance device;
a control device configured to:
determine by which of the robot or the operator the target article is to be processed, in accordance with process information generated based on a result of handling and processing of an article by the robot in past, and
transport the target article to the first conveyance device when the control device determines that the target article is to be processed by the robot, and transport the target article to the second conveyance device when the control device determines that the target article is to be processed by the operator;
a common conveyance device configured to transport the target article;
a distribution device configured to transport the target article transported by the common conveyance device to the first conveyance device or the second conveyance device; and
a distribution control device configured to control an operation of the distribution device,
wherein the distribution device switches positions to which the target article is output, in accordance with control by the distribution control device.

* * * * *